United States Patent
Pierce et al.

(10) Patent No.: US 11,106,344 B2
(45) Date of Patent: Aug. 31, 2021

(54) METHODS AND DEVICES FOR CAPTURING HEURISTIC INFORMATION VIA A WEIGHTING TOOL

(71) Applicant: DecisionNext, Inc., San Francisco, CA (US)

(72) Inventors: Robert David Pierce, Berkeley, CA (US); David Rodriguez Gomez, Redwood City, CA (US); Arden Martin Arnold, San Francisco, CA (US); Michael R. Neal, San Francisco, CA (US)

(73) Assignee: DECISIONNEXT, INC., San Francisco, CA (US)

( * ) Notice: Subject to any disclaimer, the term of this patent is extended or adjusted under 35 U.S.C. 154(b) by 0 days.

(21) Appl. No.: 16/299,351

(22) Filed: Mar. 12, 2019

(65) Prior Publication Data
US 2020/0293183 A1 Sep. 17, 2020

(51) Int. Cl.
G06F 3/048 (2013.01)
G06F 3/0484 (2013.01)
G06F 3/0482 (2013.01)
G06F 3/01 (2006.01)

(52) U.S. Cl.
CPC ........ G06F 3/04847 (2013.01); G06F 3/0482 (2013.01); G06F 2203/04803 (2013.01)

(58) Field of Classification Search
CPC .......................... G06F 3/0482; G06F 3/04847
See application file for complete search history.

(56) References Cited

U.S. PATENT DOCUMENTS

| | | | | |
|---|---|---|---|---|
| 2013/0024173 | A1* | 1/2013 | Brzezicki | G06F 30/20 703/6 |
| 2016/0170998 | A1* | 6/2016 | Frank | H04W 4/021 707/748 |
| 2017/0300933 | A1* | 10/2017 | Mascaro | G06N 7/005 |
| 2018/0350453 | A1* | 12/2018 | Nag | G06F 3/0482 |
| 2018/0371545 | A1* | 12/2018 | Wong | C07K 14/7051 |
| 2019/0174170 | A1* | 6/2019 | Chen | H04N 21/4532 |

* cited by examiner

*Primary Examiner* — Nicholas Augustine
(74) *Attorney, Agent, or Firm* — Fernando & Partners, LLP

(57) ABSTRACT

In accordance with various embodiments, a method is performed at an electronic device including a display device and one or more input devices. The method includes displaying, on the display device, a first graphing area section presenting a plot of a first set of data points for a first variable. The method includes detecting, via the one or more input devices, a first user input indicative of a selection of a portion of the first graphing area section. The method includes determining, based on the first user input indicative of a selection of a portion of the first graphing area section, a portion of the first set of data points for the first variable. The method includes detecting, via the one or more input devices, a second user input indicative of a weighting of the portion of the first set of data points for the first variable. The method includes determining, based on the weighting, a second set of data points. The method includes displaying, on the display device, a second graphing area section presenting a plot of the second set of data points.

19 Claims, 21 Drawing Sheets

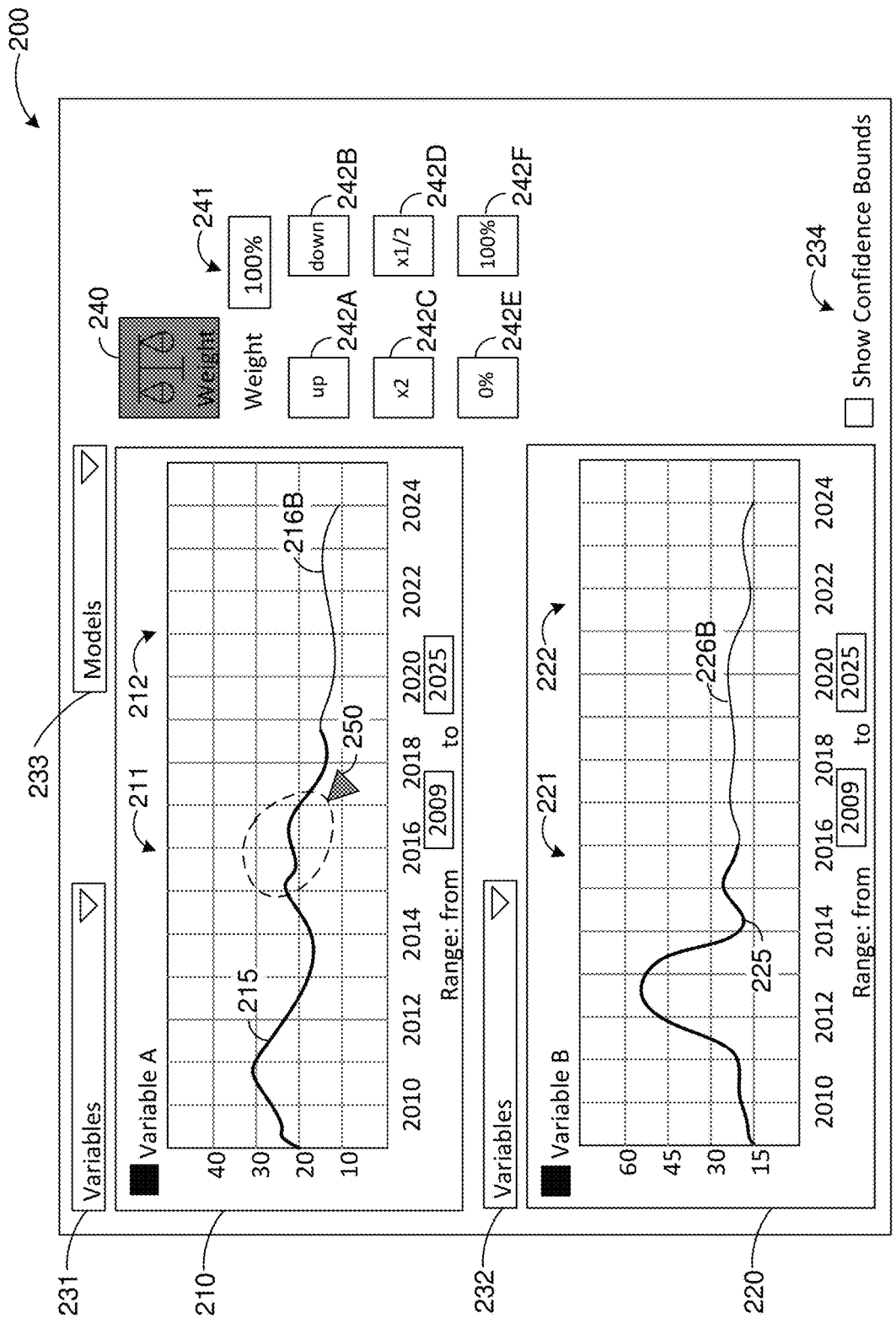
Figure 2H1

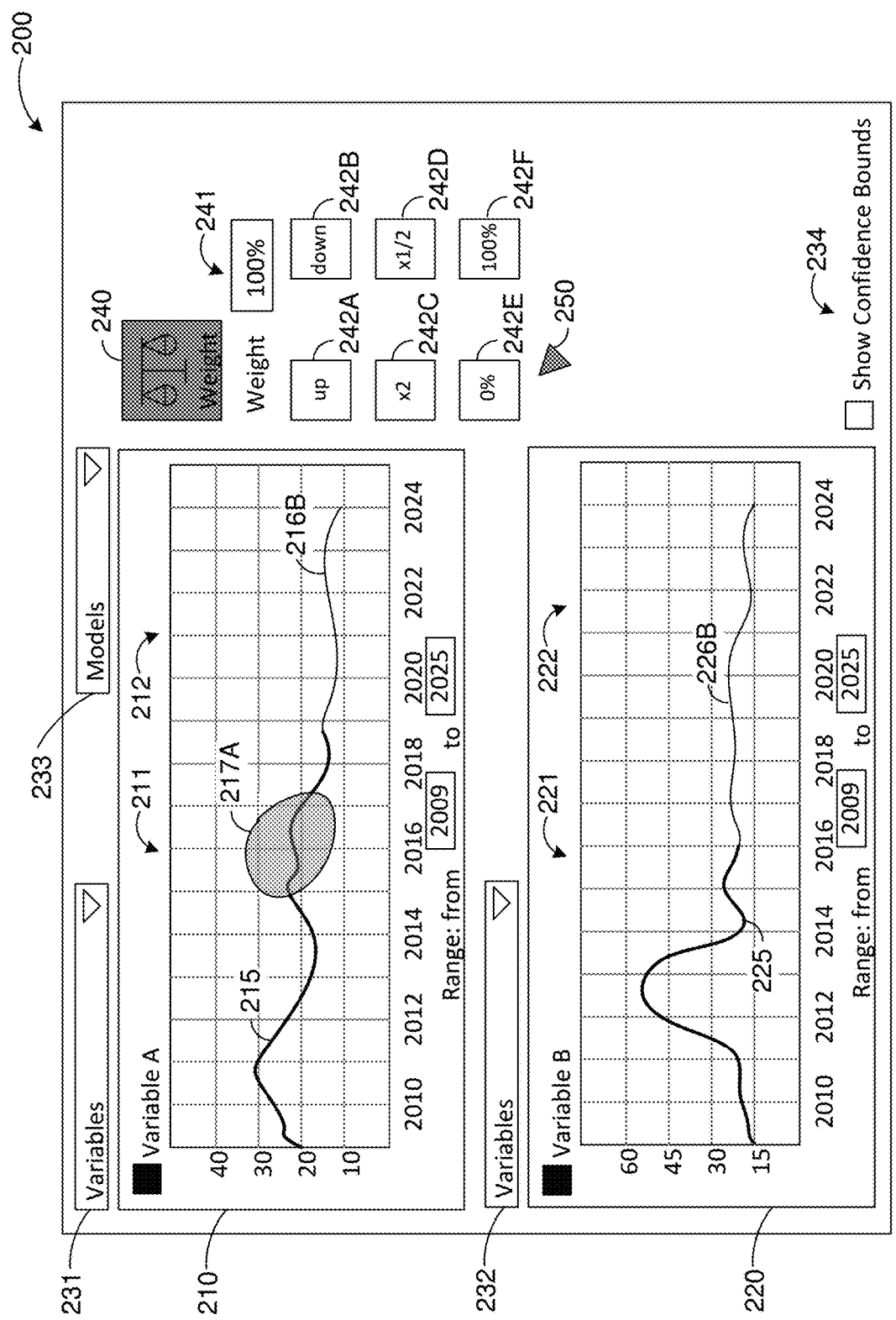
Figure 2H2

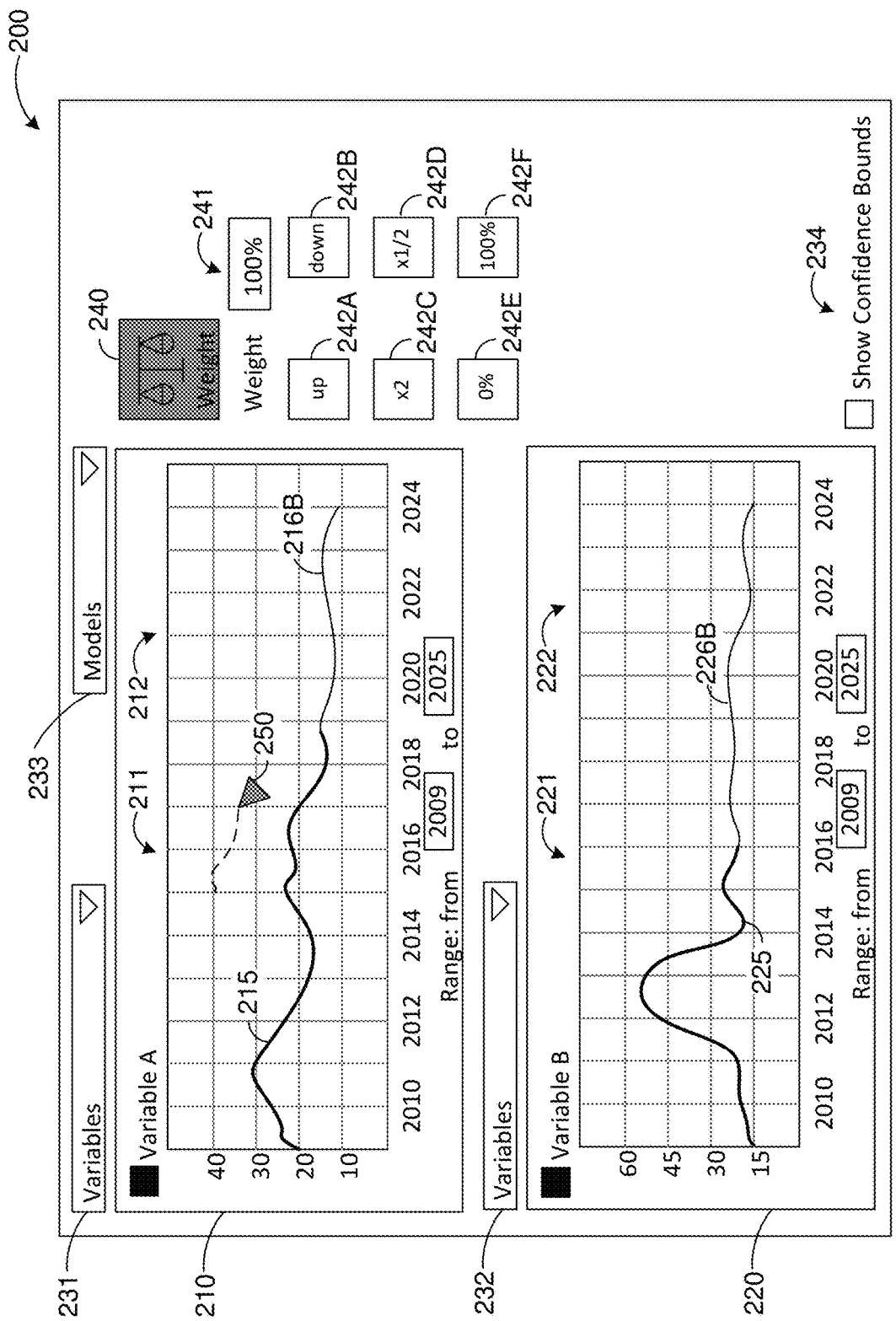
Figure 2I1

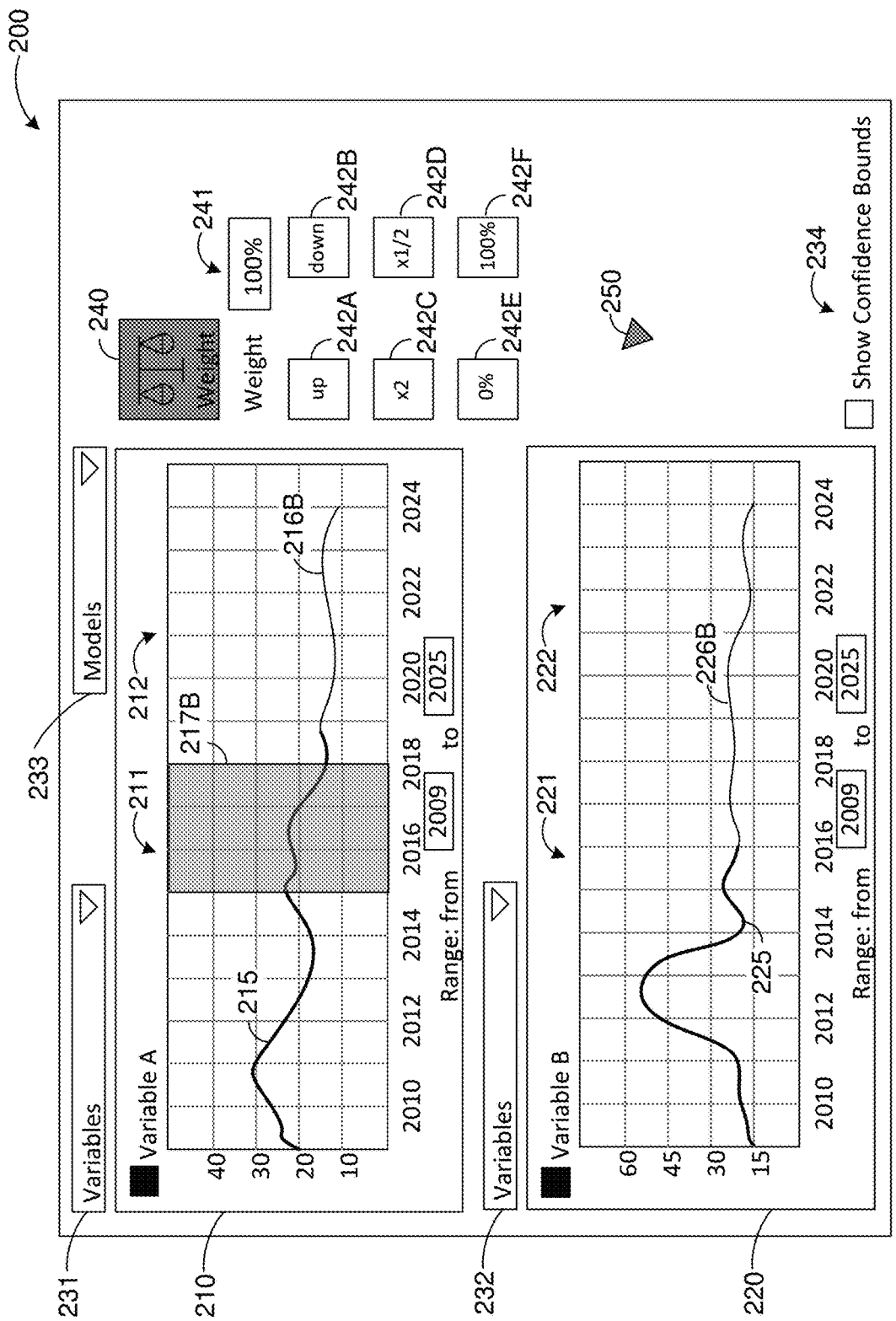
Figure 2I3

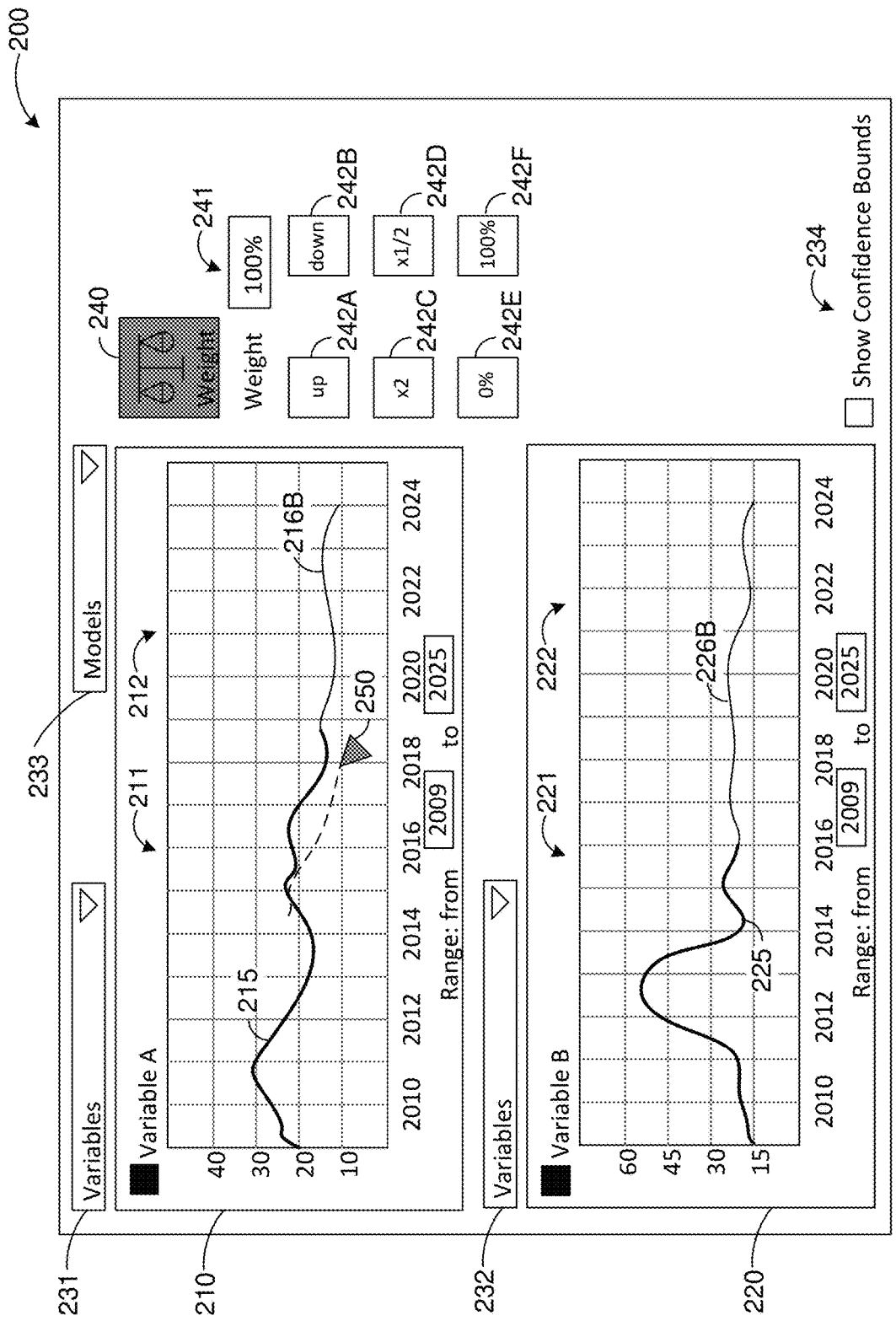
Figure 2J1

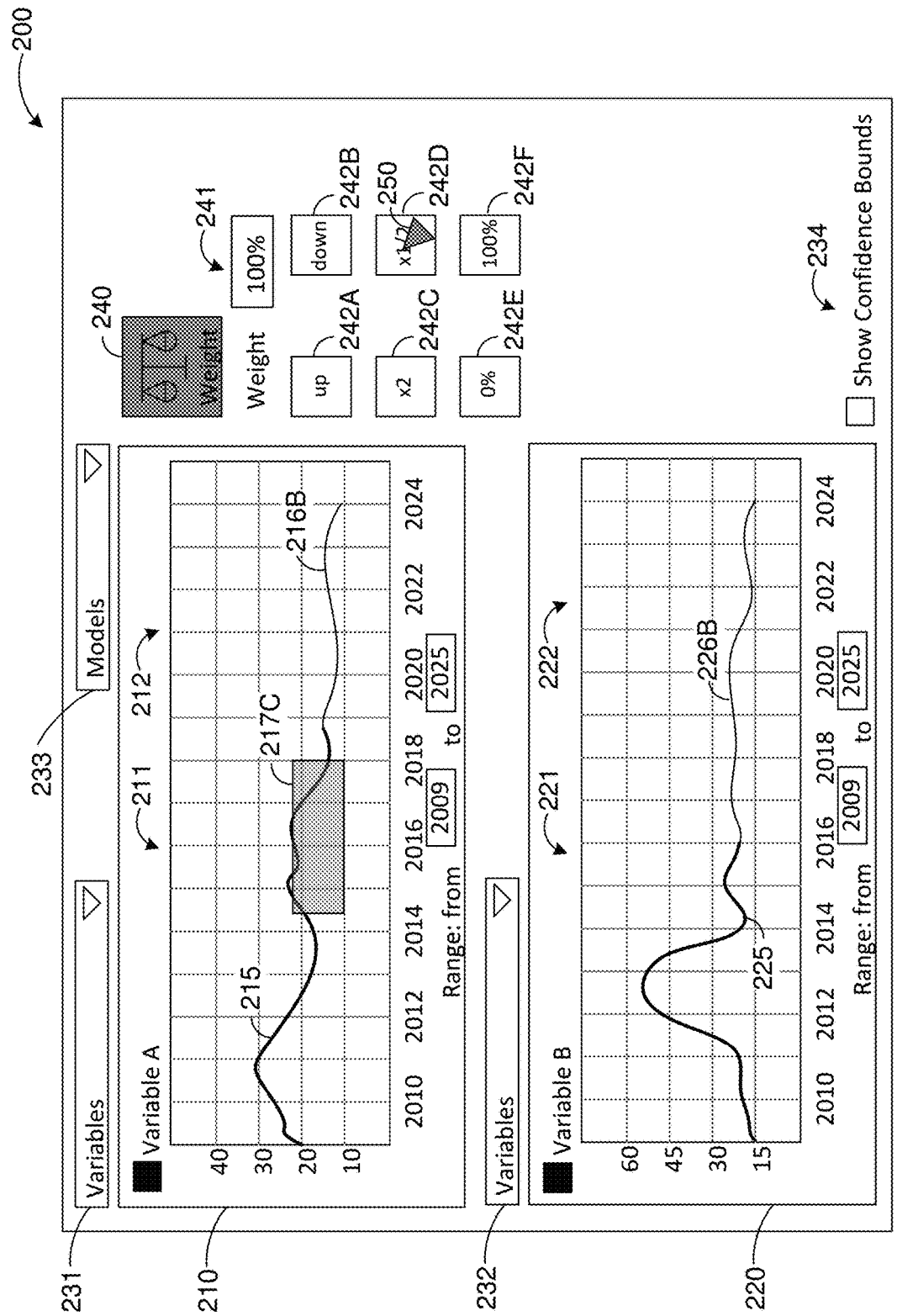
Figure 2J2

METHODS AND DEVICES FOR CAPTURING HEURISTIC INFORMATION VIA A WEIGHTING TOOL

TECHNICAL FIELD

The present disclosure generally relates generally to user interfaces for manipulating data.

BACKGROUND

When modeling a multi-variate system, data can be obtained from a number of different sources in a number of different forms. This data can be used to generate predicted data based on one or more models. However, it is difficult to integrate expert heuristic information (based on their expertise or proprietary information) into the modeling.

BRIEF DESCRIPTION OF THE DRAWINGS

For a better understanding of aspects of the various embodiments described herein and to show more clearly how they may be carried into effect, reference is made, by way of example only, to the accompanying drawings.

Figure 1:
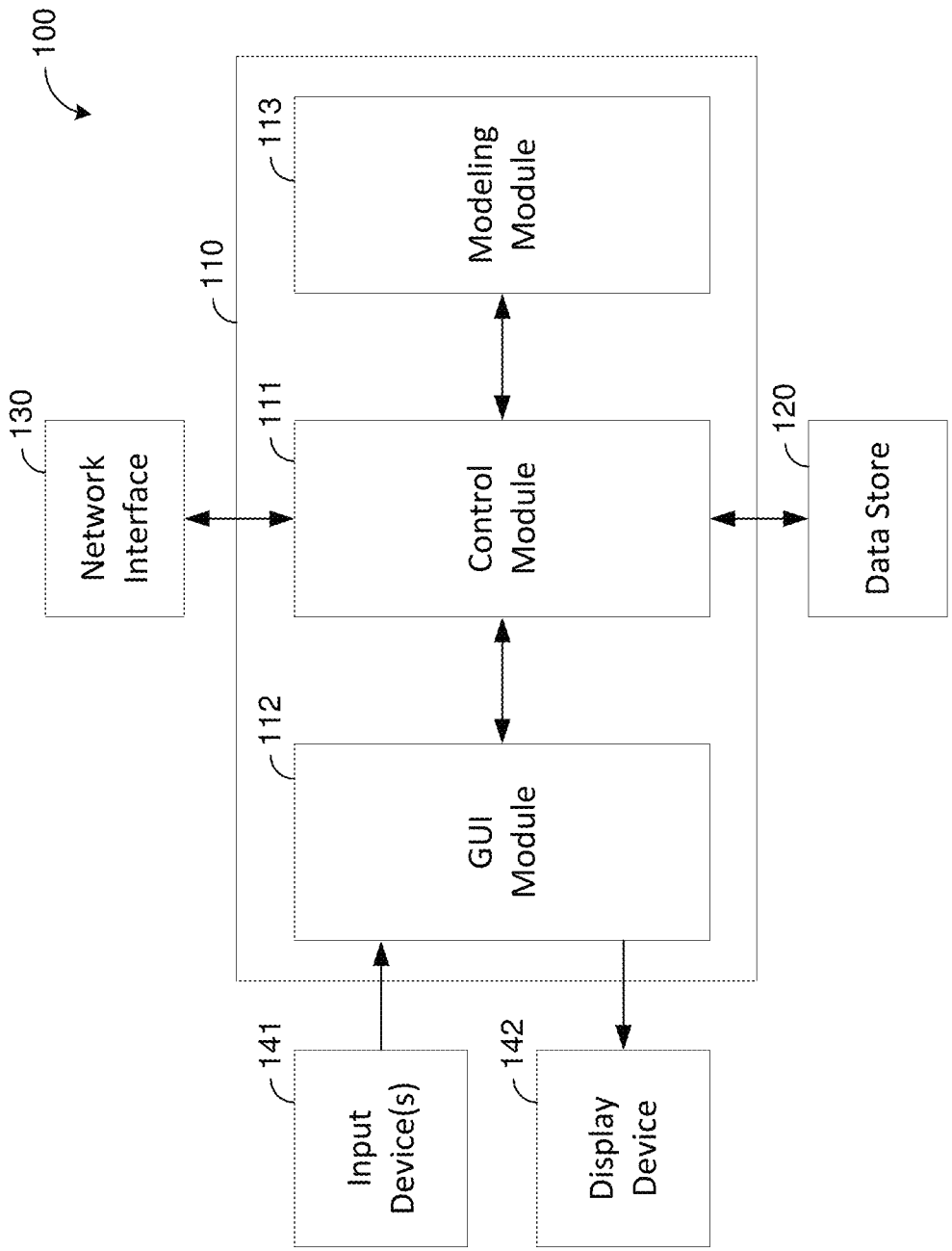
FIG. 1 is a block diagram of a modeling system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example embodiments described herein.

Various embodiments disclosed herein include devices, systems, and methods for displaying modeled data. In various embodiments, a method performed at an electronic device including a display device and one or more input devices includes displaying, on the display device, a first graphing area section presenting a plot of a first set of data points for a first variable. The method includes detecting, via the one or more input devices, a first user input indicative of a selection of a portion of the first graphing area section. The method includes determining, based on the user input indicative of a selection of the portion of the first graphing area section, a portion of the first set of data points for the first variable. The method includes detecting, via the one or more input devices, a second user input indicative of a weighting of the portion of the set of the data points for the first variable. The method includes determining, based on the weighting, a second set of data points. The method includes displaying, on the display device, a second graphing area section presenting a plot of the second set of data points.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of a device, cause the device to perform or cause performance of any of the methods described herein. In accordance with some embodiments, a device includes: one or more processors, a non-transitory memory, and means for performing or causing performance of any of the methods described herein.

As noted above, a modeling system can use data obtained from a number of different sources in a number of different formats to generate predicted data based on one or more models. In general, the accuracy of the model increases when more data is provided to system. However, it is difficult to integrate expert heuristic information from a user (e.g., data based on the user's expertise or proprietary information otherwise unavailable) into the modeling. To that end, in various implementations, a number of user interface enhancements are provided as an efficient mechanism for capturing the expert heuristic information.

For example, a biometric modeling system can obtain calorie expenditure data from a wearable device (such as a smartwatch), obtain calorie intake data input via a calorie-counting application, and, using one or more biometric models, generate modeled data regarding body size. In various implementations, a user interface enhancement is provided that allows a user to efficiently provide information regarding future calorie expenditure or calorie intake (e.g., based on user knowledge that cannot otherwise be efficiently captured) and see the future effect on body size. In various implementations, a user interface enhancement is provided that allows a user to change the weighting of particular data points used in the one or more models. For example, knowing that calorie expenditure data for a particular month was unusually high or calorie intake data for a particular month was unusually low, a user interface enhancement is provided that allows the user to lower the modeling weights for data points corresponding to that particular month and see the effect on body size. In various implementations, the one or more models calculate a relationship between variables (e.g., a covariance between the calorie expenditure data and the calorie intake data). In various implementations, a user interface enhancement is provided that allows a user to efficiently provide information regarding this relationship. For example, knowing that calorie expenditure is more dependent on calorie intake than the model deduces based on the obtained data, the user can efficiently change the covariance used in calculating body size.

As another example, a climate modeling system can obtain $CO_2$-level data from a freely-available online source, obtain sea surface temperature data from a weather satellite, and, using one or more climate models, generate modeled data regarding glacial ice amounts. In various implementations, a user interface enhancement is provided that allows a user to efficiently provide information regarding future $CO_2$ levels or sea surface temperature and see the future effect on glacial ice amounts. In various implementations, a user interface enhancement is provided that allows a user to change the weighting in the one or more models of particular data points. For example, predicting that sea surface temperature in future years will more likely track that in a particular previous year, a user interface enhancement is provided that allows the user to increase the modeling weights for data points corresponding to that particular year and see the effect on glacial ice amounts. In various implementations, the one or more models calculate a relationship between variables (e.g., a covariance between the $CO_2$-level data and the sea surface temperature data). In various implementations, a user interface enhancement is provided that allows a user to efficiently provide information regarding this relationship. For example, knowing that sea surface temperature is less dependent on $CO_2$ levels than the model deduces based on the obtained data, the user can efficiently change the covariance used in calculating glacial ice amounts.

FIG. 1 illustrates a modeling system 100 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the modeling system 100 includes a processor 110 coupled to a data store 120, a network interface 130, one or more input devices 141, and a display device 142. The processor 110 includes a control module 111, a graphical user interface (GUI) module 112, and a modelling module 113.

In various implementations, the data store 120 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. In various implementations, the data store 120 stores modeling data input obtained via the one or more input devices 141 or via the network interface 130 (e.g., from a private or public network, such as the Internet). In various implementations, modeling data is obtained in various ways. For example, in various implementations, the modeling data is obtained via the network interface from one or more online sources. As another example, in various implementations, the modeling data is obtained via the one or more input devices 141, either automatically or manually input by a user.

The modeling module 113 generates modeled data based on the modeling data and one or more models. In various implementations, the one or more models include functional relationships between two or more variables. In various implementations, the models includes a Markov Chain based model, e.g., a Markov regression model. In various implementations, the models include a Monte Carlo based model.

The GUI module presents the modeling data and/or the modeled data in a graphical user interface via the display device 142 and the one or more input devices 141.

The control module 111 coordinates the various elements of the modeling system 100 to achieve the functions described above and further below.

Figure 2A:
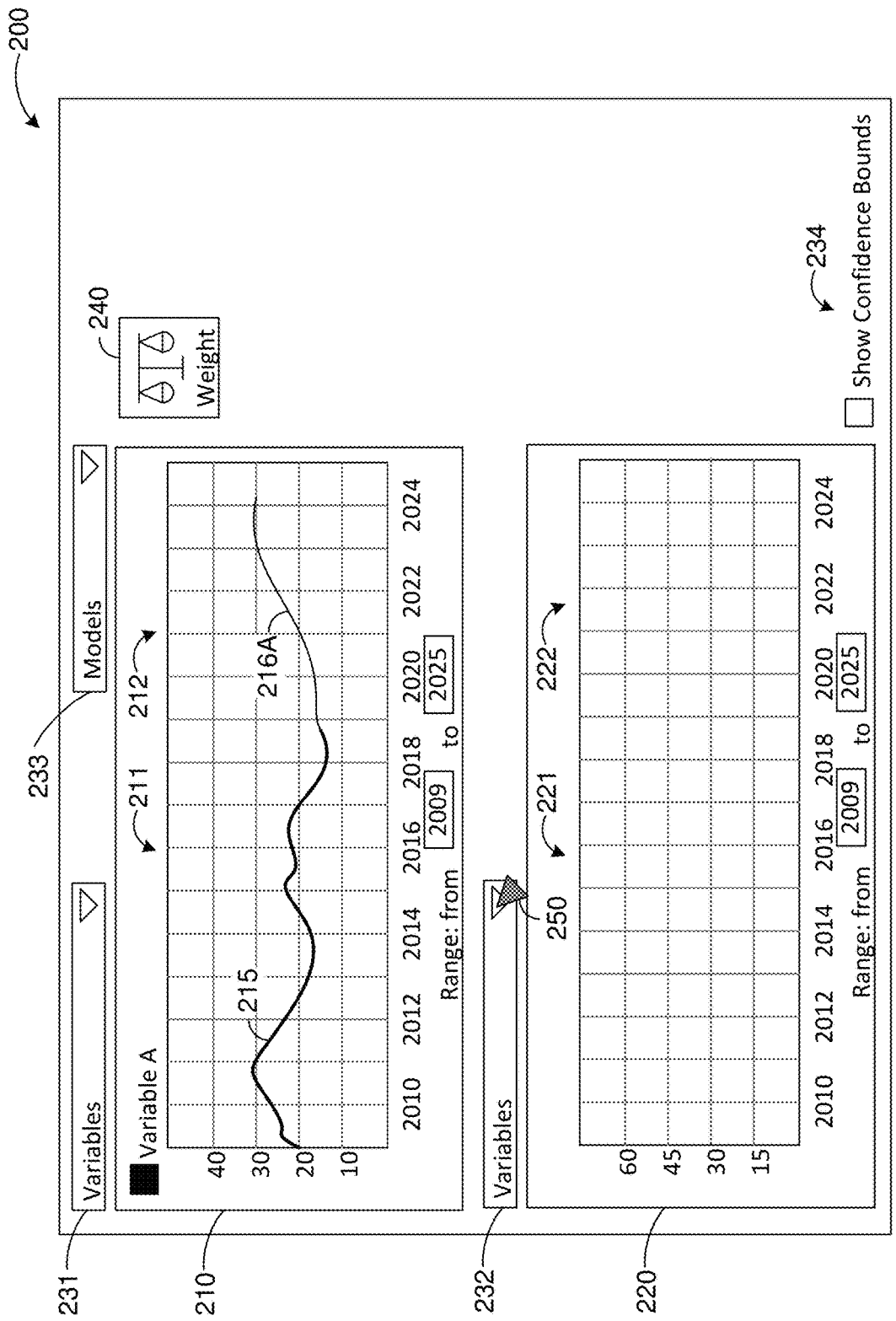
FIGS. 2A-2N illustrate example user interfaces for displaying modeled data in accordance with some embodiments.
Figure 2B:
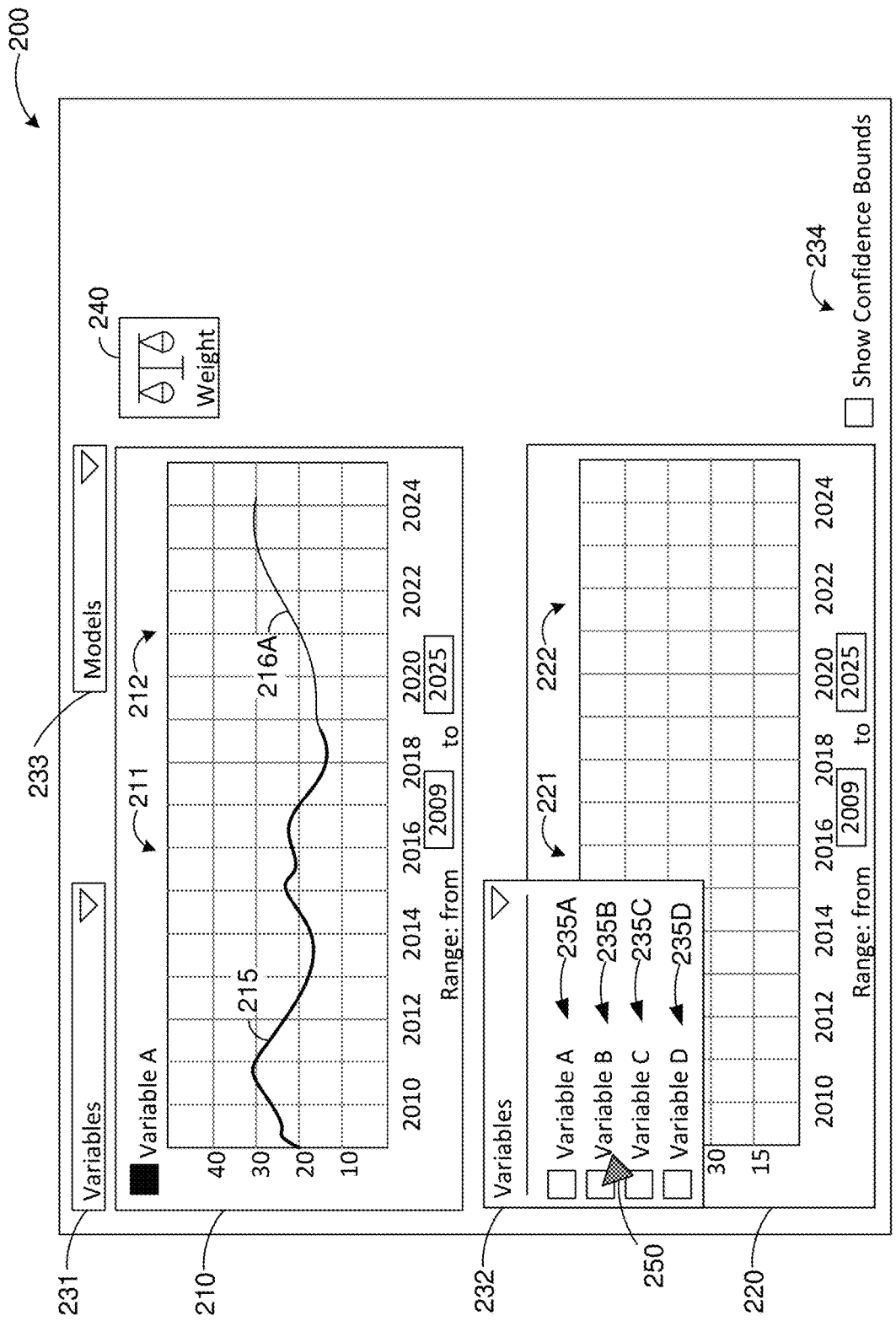
Figure 2C:
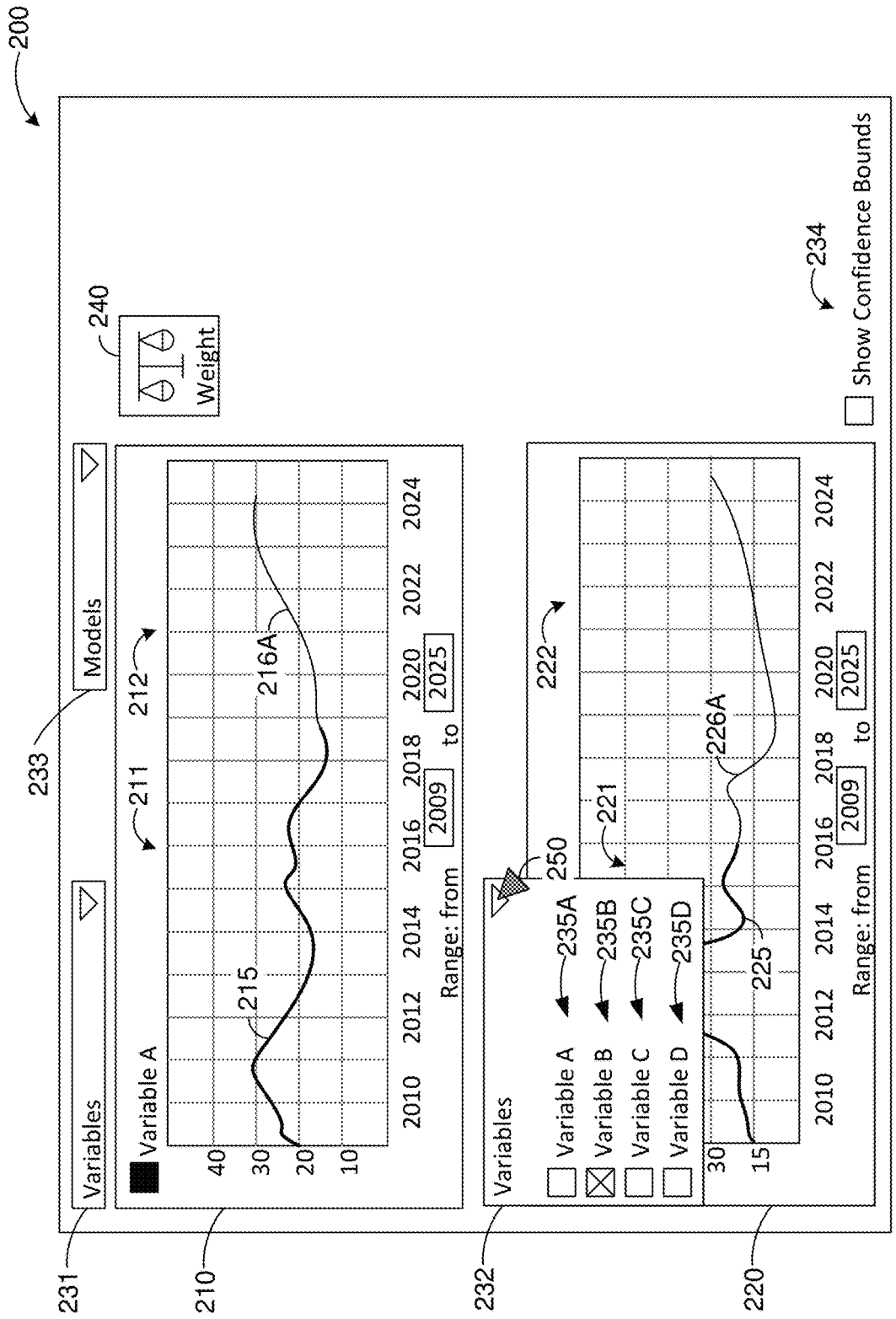
Figure 2D:
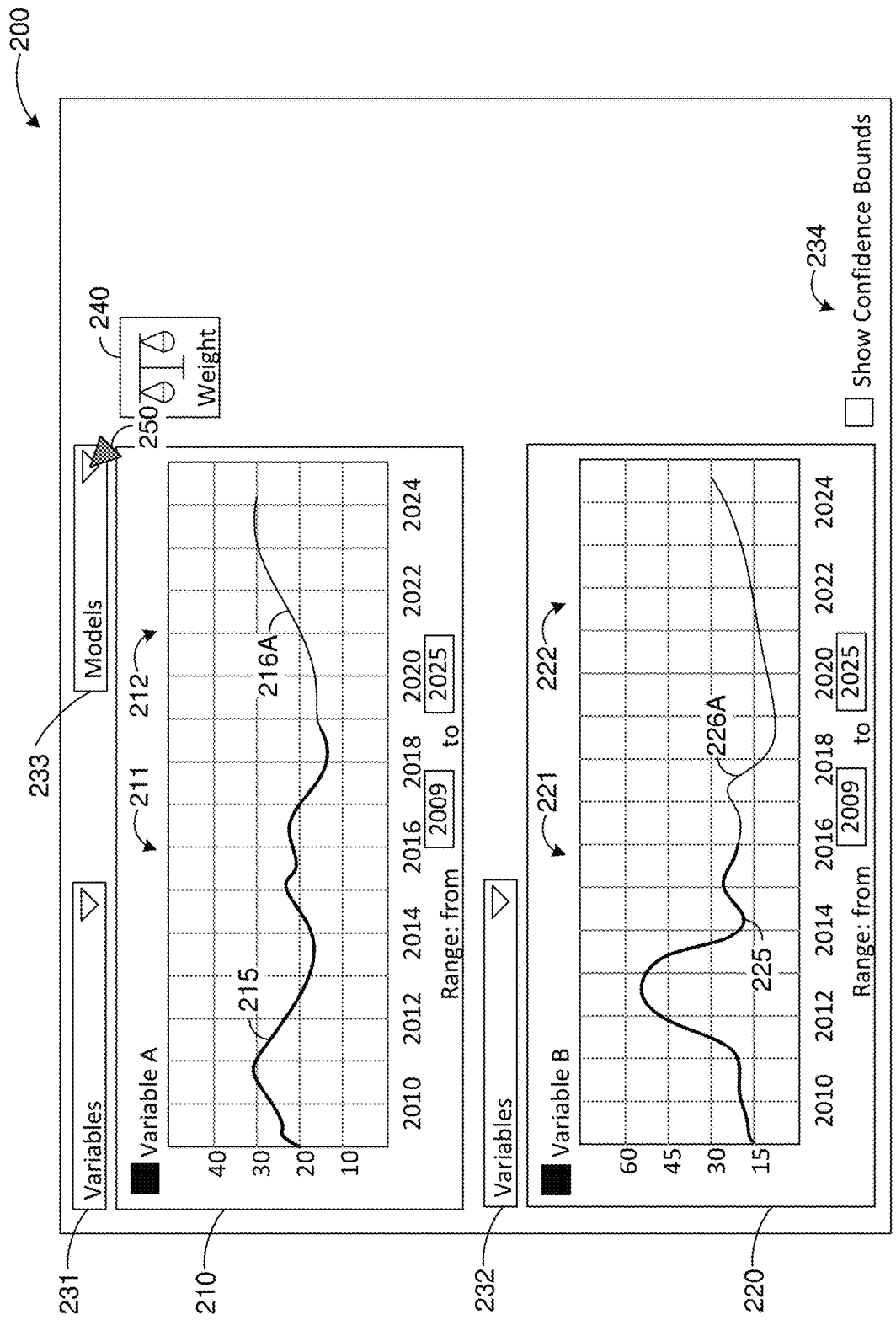
Figure 2E:
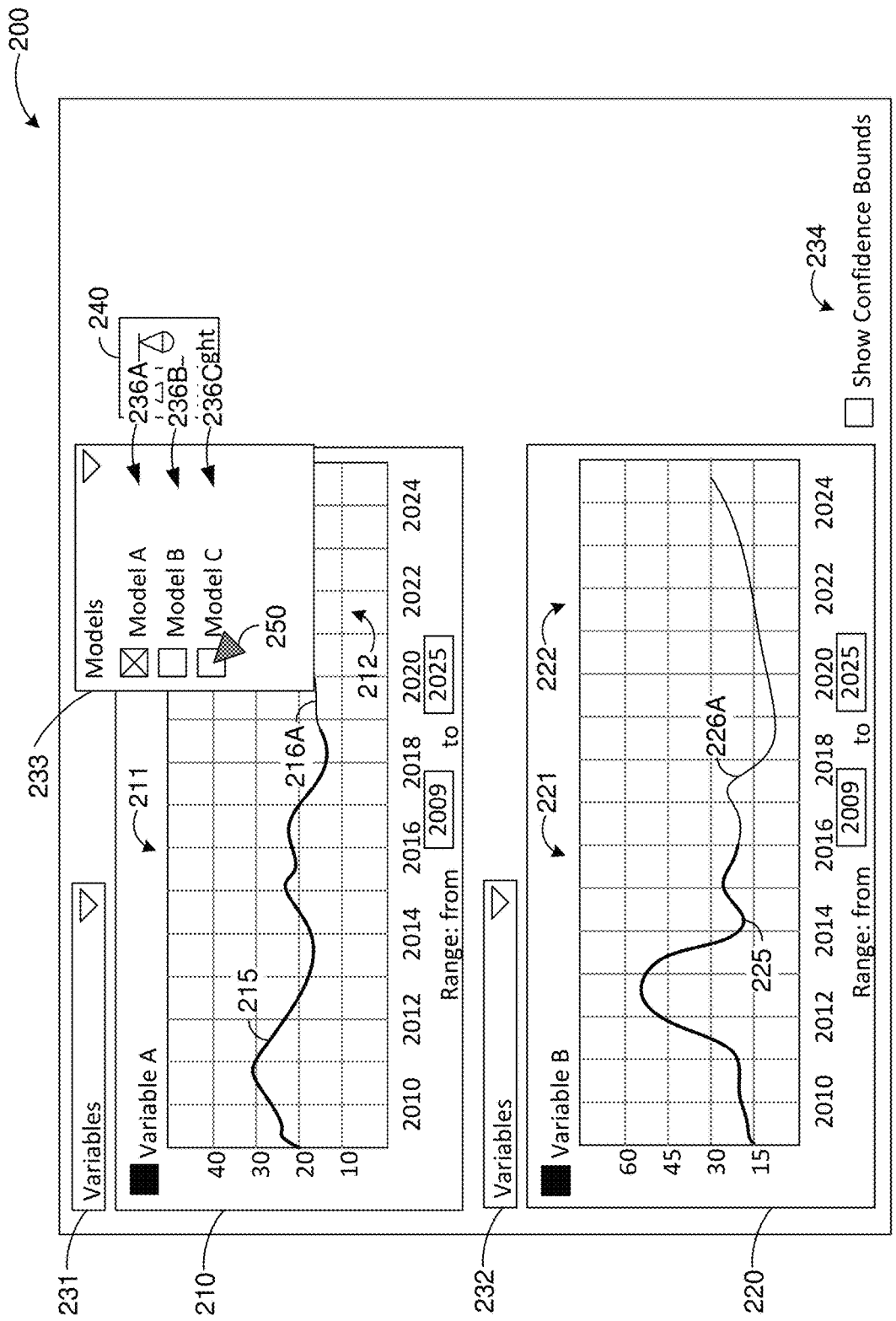
Figure 2F:
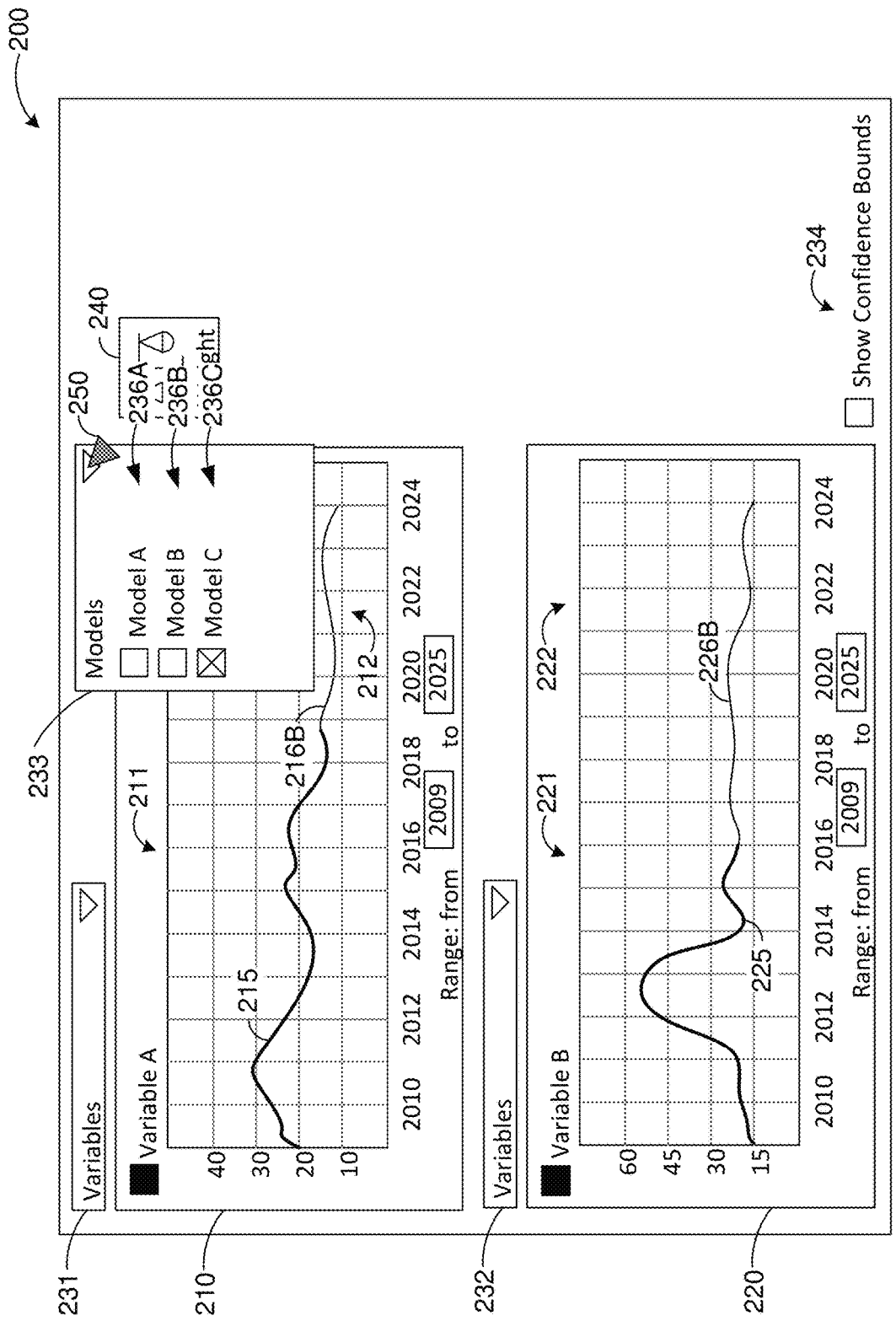
Figure 2G:
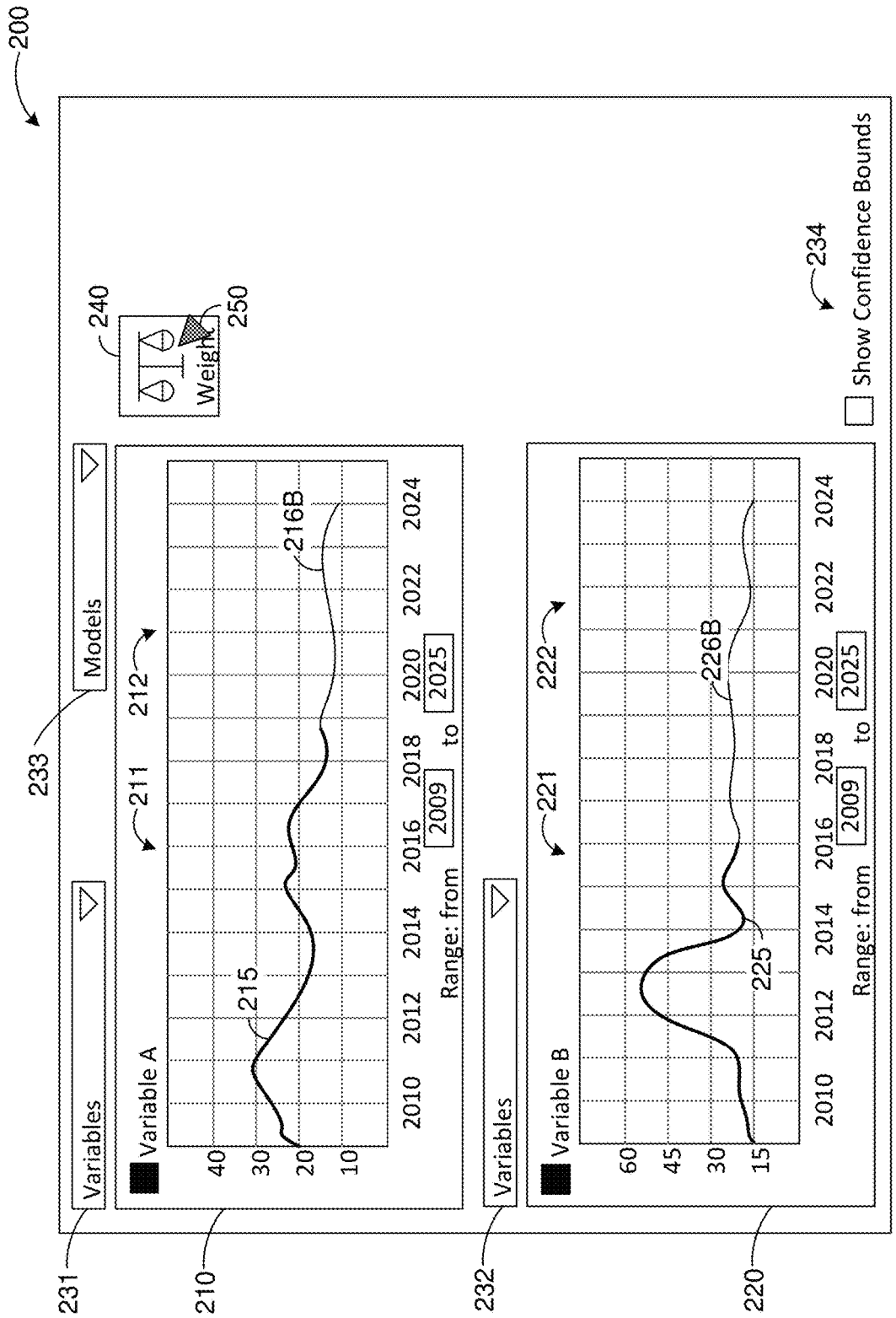
Figure 212:
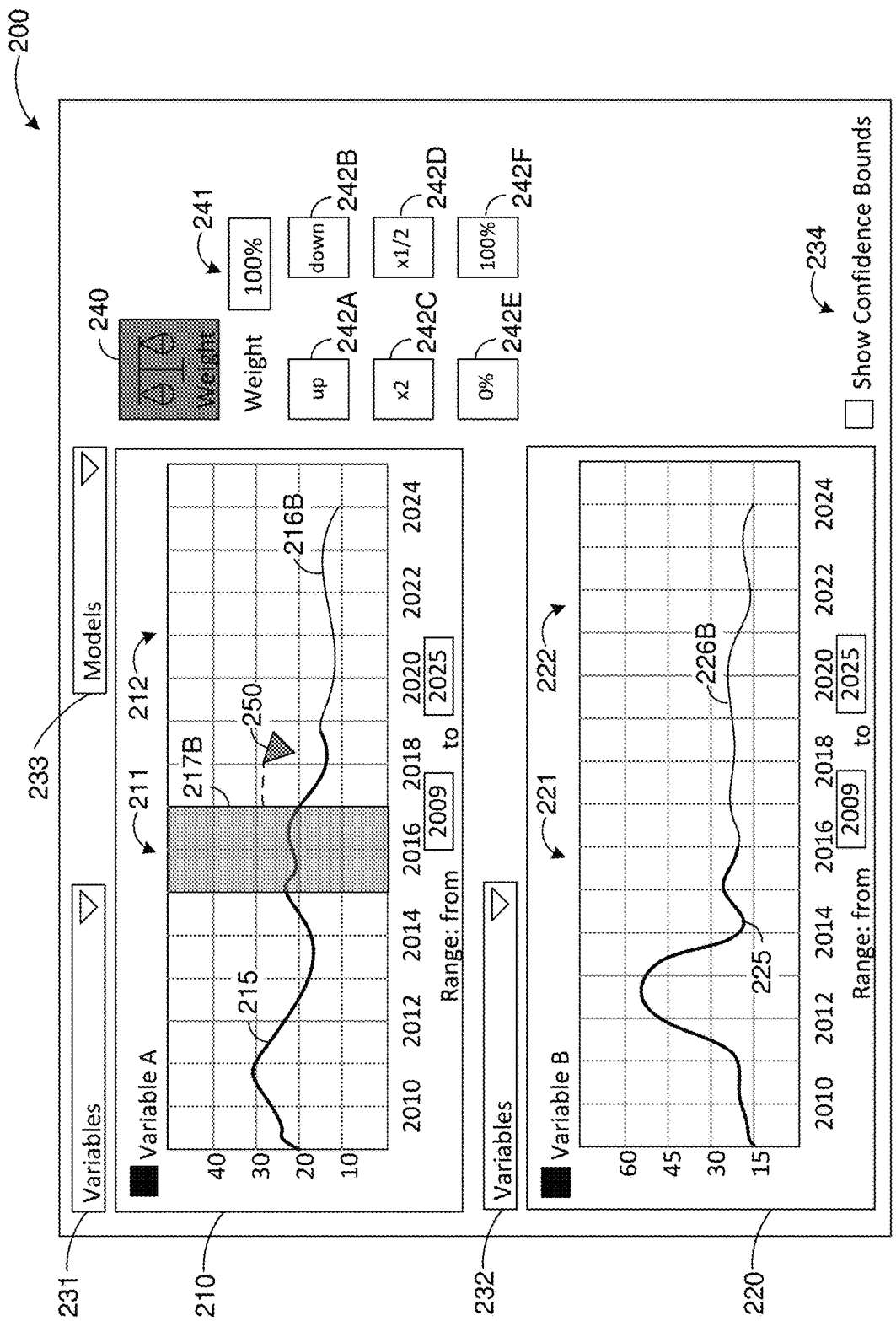
Figure 2K:
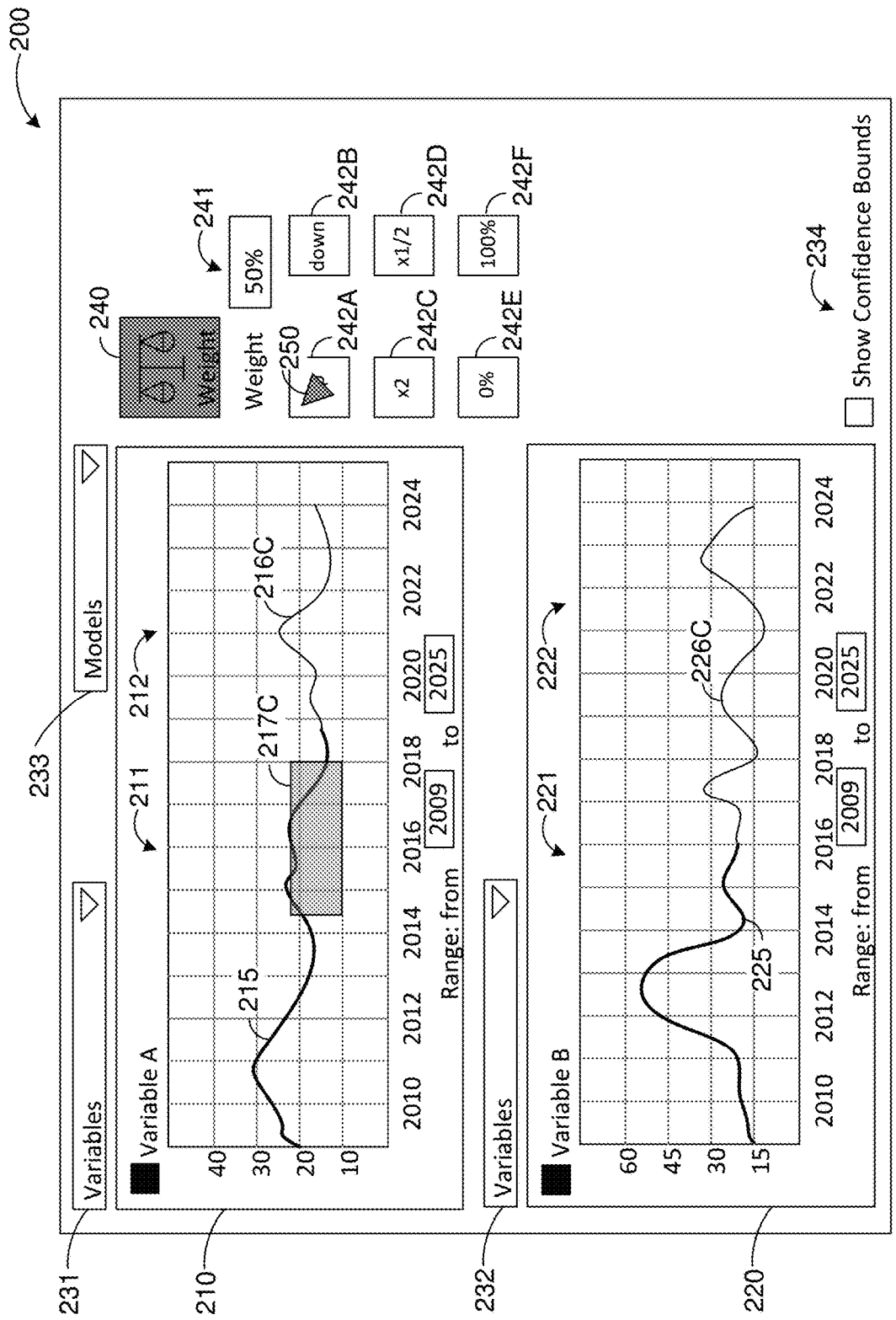
Figure 2L:
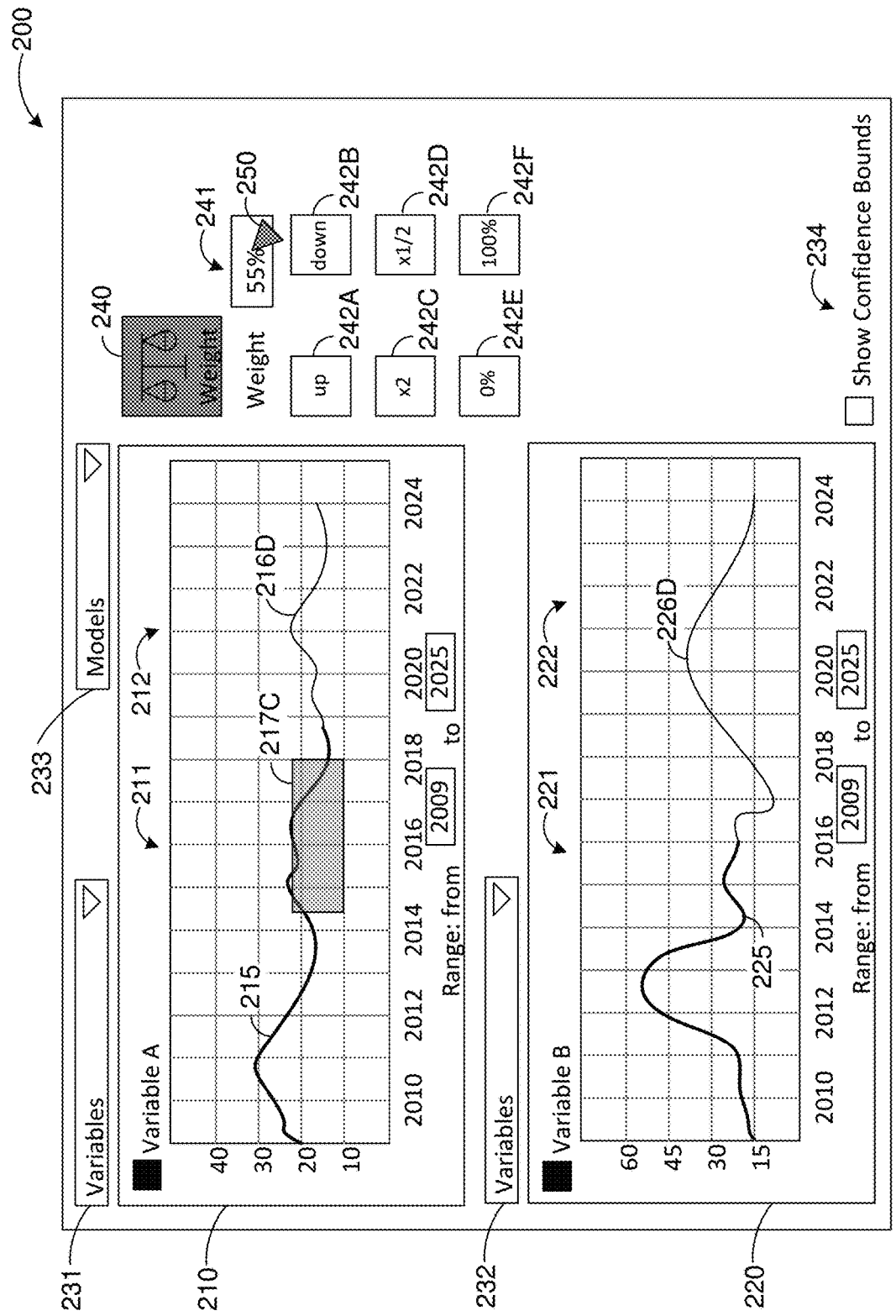
Figure 2M:
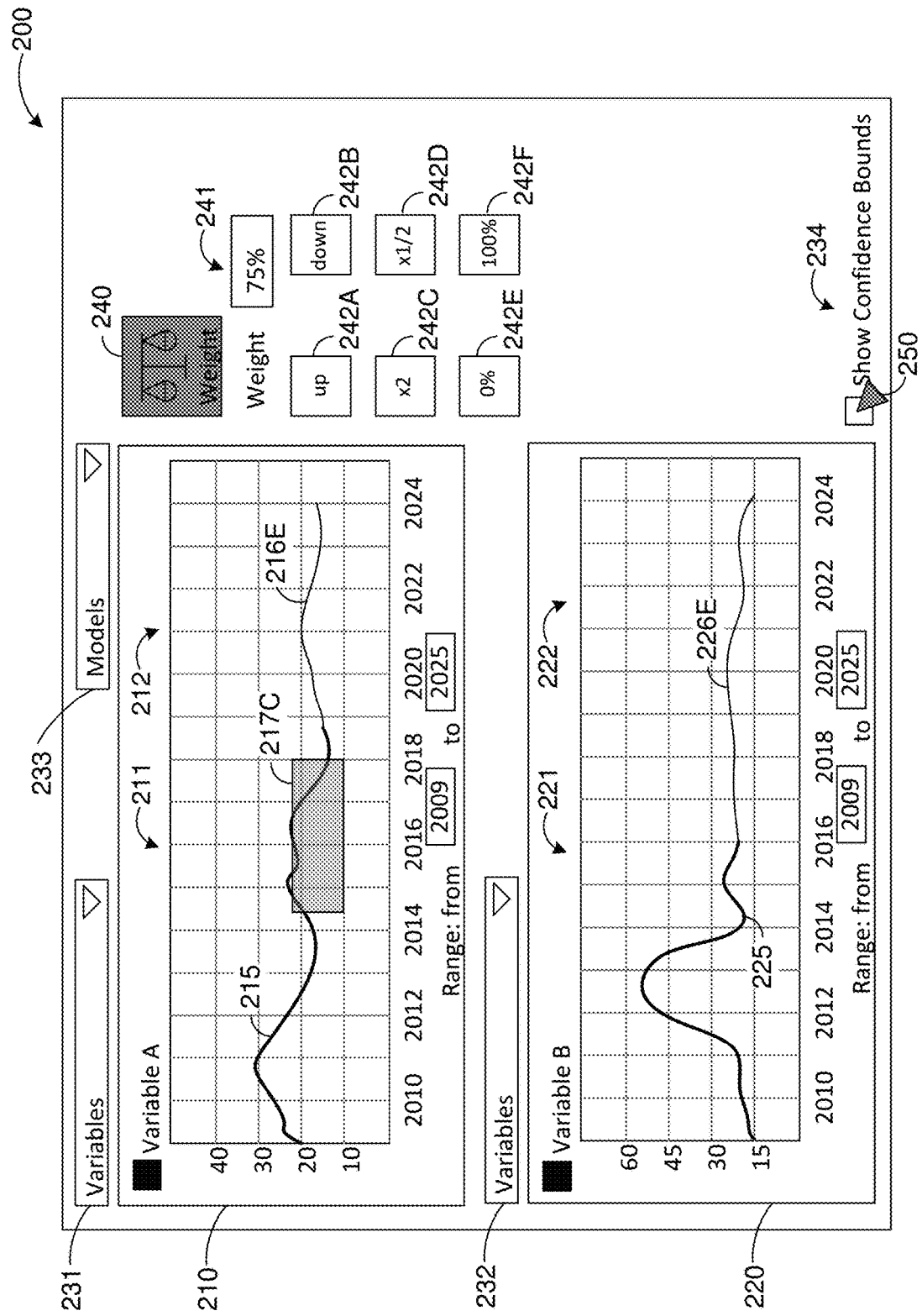
Figure 2N:
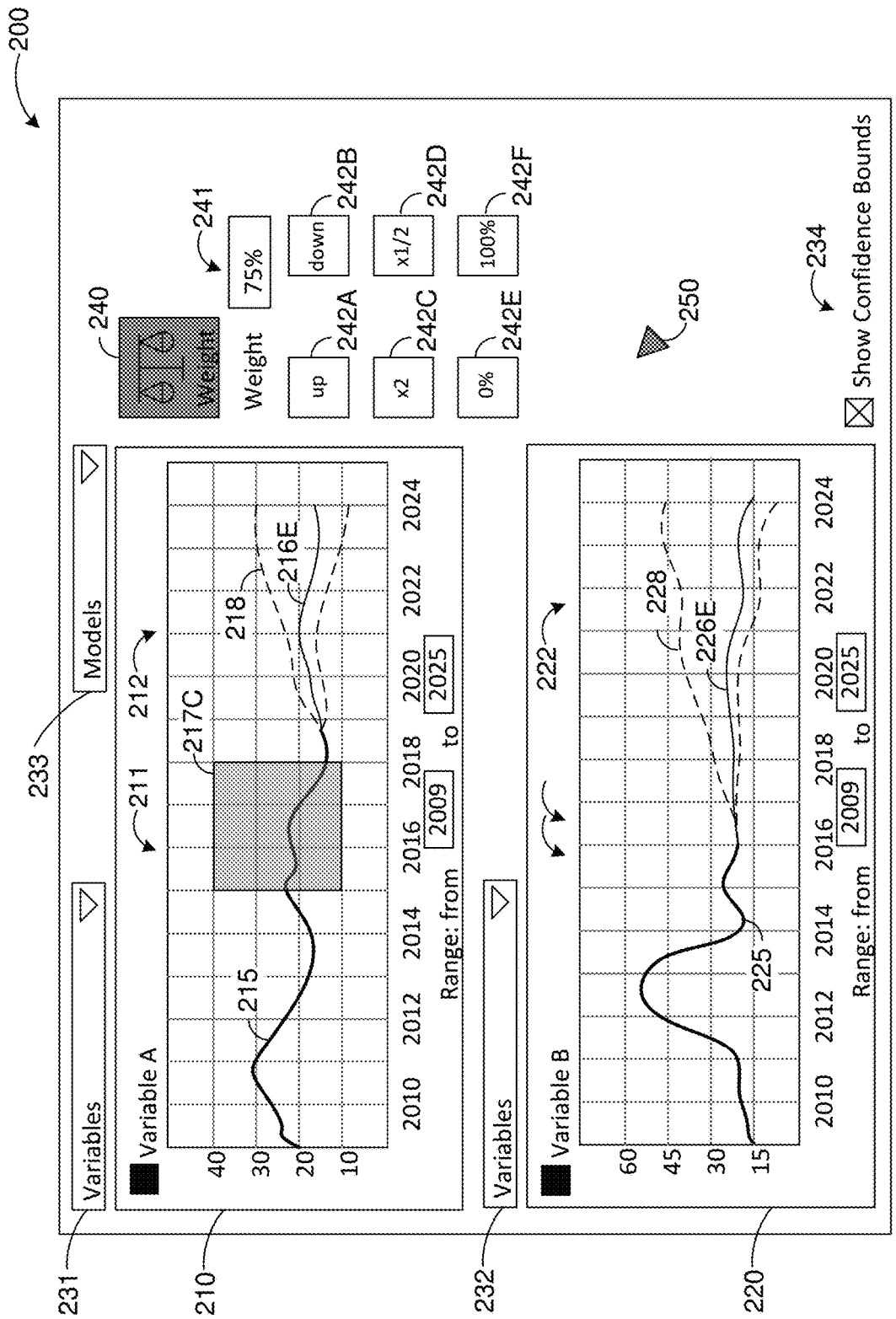

FIGS. 2A-2N illustrate example user interfaces for displaying modeled data in accordance with some embodiments. The user interfaces in these figures are used to illustrate the processes described below, including the process in FIG. 3.

FIG. 2A illustrates a user interface 200 including a first graphing area 210 and a second graphing area 220. Although FIG. 2A illustrates the second graphing area 220 separate from the first graphing area 210, in various implementations, the second graphing area 220 is displayed on top of the first graphing area 210.

The first graphing area 210 includes a first section 211 presenting a plot 215 of a first set of data points for a first variable (e.g., Variable A). The first graphing area 210 includes a second section 212 presenting a plot 216A of a second set of data points for the first variable. In various implementations, the first set of data points for the first variable represents observed data for the first variable (e.g., stored in the data store 120 of FIG. 1), such as historical data. In various implementations, the second set of data points for the first variable represents computed data for the first variable, such as predicted data or modeled data generated (e.g., by the modeling module 113 of FIG. 1) based on one or more models.

In various implementations, observed data is displayed different than computed data. For example, in FIG. 2A, the plot 215 of the first set of data points for the first variable is displayed with a thicker line than the plot 216A of the second set of data points for the first variable.

The first graphing area 210 is associated with a first variable selection affordance 231 that, when selected, allows a user to select which variable (or set of variables) is represented in the first graphing area 210. The second graphing area 220 is associated with second variable selection affordance 232 that, when selected, allows the user to select which variable (or set of variables) is represented in the second graphing area 220. The first graphing area 210 is also associated with model selection affordance 233 that, when selected, allows the user to select which model (or set of models) is used (e.g., by the modeling module 113 of FIG. 1) to generate computed data, such as the second set of data points for the first variable represented by the plot 216A.

The user interface 200 also includes a confidence toggle affordance 234 that, when selected, toggles the display of confidence bounds of plot in the first graphing area 210 and/or the second graphing area 220.

The user interface 200 includes a weighting affordance 240 that, when selected and as described further below, allows a user to draw a path within the first graphing area 210 selecting a portion of the set of data points for the first variable. A subsequent user input provides a weighting for the portion of the set of data points that is used (e.g., by the modeling module 113 of FIG. 1) to generate computed data displayed in the first graphing area 210 and/or the second graphing area 220.

The user interface 200 includes a cursor 250. FIG. 2A illustrates the cursor 250 at the location of the second variable selection affordance 232.

FIG. 2B illustrates the user interface 200 of FIG. 2A in response to detecting a user input corresponding to selection of the second variable selection affordance 232. In the user interface 200 of FIG. 2B, the second variable selection affordance 232 is expanded as a drop-down menu to include a plurality of variable display toggle affordances 235A-235D that, when selected, toggle display of a plot of data points for a respective variable.

FIG. 2B illustrates the cursor 250 at the location of a second variable display toggle affordance 235B of the plurality of variable display toggle affordances 235A-235D.

FIG. 2C illustrates the user interface 200 of FIG. 2B in response to detecting a user input corresponding to selection of the second variable display toggle affordance 235B. In the user interface 200 of FIG. 2C, the second variable display toggle affordance 235B is toggled (e.g., activated), resulting in the second graphing area 220 presenting, in a first section 221, a plot 225 of a first set of data points for the second variable (e.g., Variable B) and, in a second section 222, a plot 226A of a second set of data points for the second variable. In various implementations, the second set of data points for the second variable are generated according to a model (e.g., a first model) applied to the first set of data points for the first variable and/or the first set of data points for the second variable (and, optionally, additional data points for the first variable, additional data points for the second variable, and/or data points for additional variables).

As noted above, in various implementations, observed data is displayed different than computed data. For example, in FIG. 2C, the plot 215 of the first set of data points for the first variable and the plot 225 of the first set of the data points for the second variable are displayed with a thicker line than the plot 216A of the second set of data points for the first variable and the plot 226A of the second set of data points for the second variable.

FIG. 2C illustrates the cursor 250 at the location of the second variable selection affordance 232.

FIG. 2D illustrates the user interface 200 of FIG. 2C in response to detecting a user input corresponding to a selection of the second variable selection affordance 232. In the user interface 200 of FIG. 2D, the second variable selection affordance 232 is de-expanded to the state shown in FIG. 2A.

FIG. 2D illustrates the cursor 250 at the location of the model selection affordance 233.

FIG. 2E illustrates the user interface 200 of FIG. 2D in response to detecting a user input corresponding to selection of the model selection affordance 233. In the user interface 200 of FIG. 2E, the model selection affordance 233 is expanded as a drop-down menu to include a plurality of model affordances 236A-236C that, when selected, specify a model used (e.g., by the modeling module 113 of FIG. 1) to generate the second set of data points for the first variable represented by the plot 216A and to generate the second set of data points for the second variable represented by the plot 226A.

FIG. 2E illustrates the cursor 250 at the location of a third model affordance 236C of the plurality of model affordances 236A-236C.

FIG. 2F illustrates the user interface 200 of FIG. 2E in response to detecting a user input corresponding to selection of the third model affordance 236C. In the user interface 200 of FIG. 2F, the third model affordance 236C is toggled (e.g., activated) and the first model affordance 236A is toggled (e.g. deactivated). In various implementations, multiple model affordances are simultaneously activated and multiple plots of the same variable (generated by different models) are displayed in the first graphing area 210 and/or the second graphing area 220. In the user interface 200 of FIG. 2F, the plot 216A representing the second set of data points for the first variable generated according to the first model is replaced with a plot 216B representing a second set of data points for the first variable generated according to the third model applied to the first set of data points for the first variable (and, optionally, additional data points for the first variable and/or data points for additional variables). Similarly, the plot 226A representing the second set of data points for the second variable generated according to the first model is replaced with a plot 226B representing a second set of data points for the second variable generated according to the third model applied to the first set of data points for the first variable and/or the first set of data points for the second variable (and, optionally, additional data points for the first variable, additional data points for the second variable, and/or data points for additional variables).

FIG. 2F illustrates the cursor 250 at the location of the model selection affordance 233.

FIG. 2G illustrates the user interface 200 of FIG. 2F in response to detecting a user input corresponding to selection of the model selection affordance 233. In the user interface 200 of FIG. 2G, the model selection affordance 233 is de-expanded to the state shown in FIG. 2A.

FIG. 2G illustrates the cursor 250 at the location of the weighting affordance 240.

FIG. 2H1 illustrates a first embodiment of the user interface 200 of FIG. 2G in response to detecting a user input corresponding to selection of the weighting affordance 240. In the user interface 200 of FIG. 2H, the weighting affordance 240 is changed to indicate that a weighting mode is activated. Further, the user interface 200 includes a weight level affordance 241 that indicates a weighting of data selected while in the weighting mode and that, when selected, allows a user to input a weighting for the selected data.

The user interface 200 further includes a plurality of weight augmentation affordances 242A-242F that, when selected, augment the weighting of data selected while in the weighting mode. The plurality of weight augmentation affordances 242A-242F include a weight-increase affordance 242A that, when selected, increases the weighting of data selected while in the weighting mode by a predetermined amount (e.g., 5%). The plurality of weight augmentation affordances 242A-242F include a weight-decrease affordance 242B that, when selected, decreases the weighting of data selected while in the weighting mode by a predetermined amount (e.g., 5%). The plurality of weight augmentation affordances 242A-242F include a weight-double affordance 242C that, when selected, doubles the weighting of data selected while in the weighting mode. The plurality of weight augmentation affordances 242A-242F include a weight-half affordance 242D that, when selected, halves the weighting of data selected while in the weighting mode. The plurality of weight augmentation affordances 242A-242F include a disregard affordance 242E that, when selected, reduces the weighting of data selected while in the weighting mode to 0%. The plurality of weight augmentation affordances 242A-242F include a default affordance 242F that, when selected, sets the weighting of data selected while in the weighting mode to 100%.

FIG. 2H1 illustrates the cursor 250 moving along a path within the first section 211 of the first graphing area 210.

FIG. 2H2 illustrates the user interface 200 of FIG. 2H1 in response to detecting the cursor moving along the path within the first section 211 of the first graphing area 210. In FIG. 2H2, the user interface 200 includes a selection indicator 217A indicating a portion of the first section 211 of the first graphing area 210 corresponding to a portion of the first set of data points for the first variable.

Accordingly, in various implementations, a user selects a portion of the first set of data points for the first variable by drawing a path enclosing the corresponding portion of the first section 211 of the first graphing area 210.

As compared to FIG. 2H1, FIG. 2I1 illustrates a second embodiment of the user interface 200 of FIG. 2G in response to detecting a user input corresponding to selection of the weighting affordance 240.

FIG. 2I1 illustrates the cursor 250 moving along a path within the first section 211 of the first graphing area 210.

FIG. 2I2 illustrates the user interface 200 of FIG. 2I1 in response to detecting the cursor moving along the path within the first section 211 of the first graphing area 210. In FIG. 2I2, the user interface 200 includes a selection indicator 217B indicating a portion of the first section 211 of the first graphing area 210 corresponding to a portion of the first set of data points for the first variable.

Accordingly, in various implementations, a user selects a portion of the first set of data points for the first variable by drawing a path from a first location corresponding to a first value of a first coordinate of the first graphing area 210 (e.g., a first location corresponding to a first time) to a second location correspond to a second value of the first coordinate of the first graphing area 210 (e.g., a second location corresponding to a second time).

FIG. 2I2 illustrates the cursor 250 moving along a path from a location of the selection indicator 217B.

Figure 3:
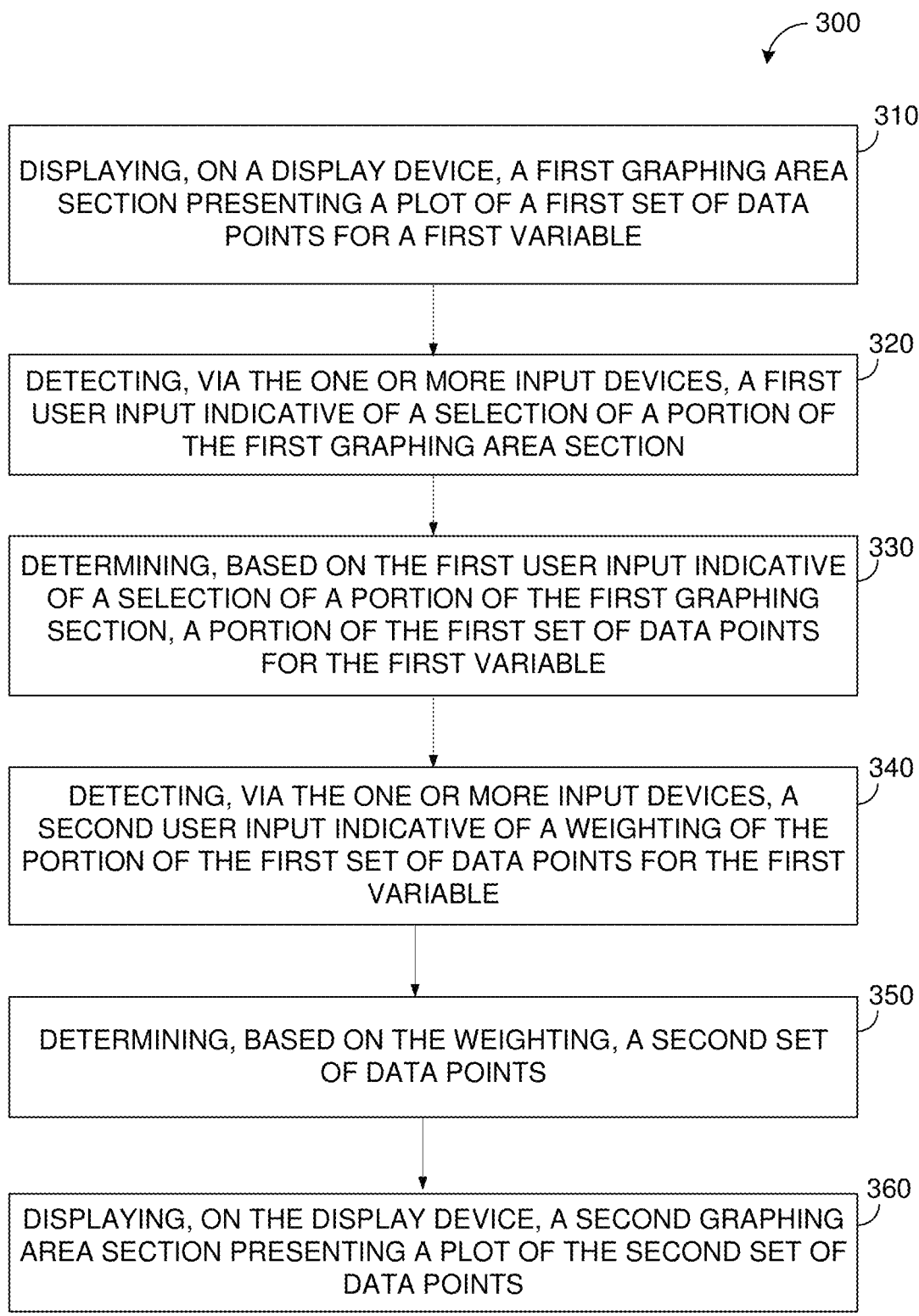
FIG. 3 is a flowchart representation of a method of displaying modeled data in accordance with some embodiments.

FIG. 2I3 illustrates the user interface 200 of FIG. 2I2 in response to detecting the cursor moving along the path from the location of the selection indicator 217B. In FIG. 2I3, the size of the selection indicator 217B is increased in accordance with the path of the cursor 250. Accordingly, in various implementations, a user selects a portion of the first set of data points for the first variable by changing a size (and/or shape) of a selection indicator.

As compared to FIG. 2H1, FIG. 2J1 illustrates a third embodiment of the user interface 200 of FIG. 2G in response to detecting a user input corresponding to selection of the weighting affordance 240.

FIG. 2J1 illustrates the cursor 250 moving along a path within the first section 211 of the first graphing area 210.

FIG. 2J2 illustrates the user interface 200 of FIG. 2J1 in response to detecting the cursor moving along the path within the first section 211 of the first graphing area 210. In FIG. 2J2, the user interface 200 includes a selection indicator 217C indicating a portion of the first section 211 of the first graphing area 210 corresponding to a portion of the first set of data points for the first variable.

Accordingly, in various implementations, a user selects a portion of the first set of data points for the first variable by drawing a path from a first location corresponding to both a first value of a first coordinate of the first graphing area 210 and a first value of a second coordinate of the first graphing area 210 (e.g., a first location corresponding to a first time and a first variable value) to a second location corresponding to both a second value of the first coordinate of the first graphing area 210 and a second value of the second coordinate of the first graphing area 210 (e.g., a second location corresponding to a second time and a second variable value).

FIG. 2J2 illustrates the cursor 250 at the location of the weight-half affordance 242D.

FIG. 2K illustrates the user interface 200 of FIG. 2J2 in response to detecting a user input corresponding to selection of the weight-half affordance 242D. In response to detecting the user input corresponding to selection of the weight-half affordance 242D, the weight level affordance 241 indicates that the weighting of the selected data (e.g., the portion of the first set of data points corresponding to the portion of the first section 211 of the first graphing area 210 indicated by the selection indicator 217C) has changed from 100% to 50%.

Accordingly, the plot 216B representing a second set of data points for the first variable generated according to the third model applied to the first set of data points for the first variable (and, optionally, additional data points for the first variable and/or data points for additional variables) with all of the first set of data points of the first variable equally weighted is replaced with a plot 216C representing a second set of the data points for the first variable generated according to the third model applied to the first set of data points for the first variable (and, optionally, additional data points for the first variable and/or data points for additional variables) with the portion of the first set of data points corresponding to the portion of the first section 211 of the first graphing area 210 indicated by the selection indicator 217C weighted by half as compared to the remainder of the first set of data points for the first variable.

Similarly, the plot 226B representing a second set of data points for the second variable generated according to the third model applied to the first set of data points for the first variable and the first set of data points for the second variable (and, optionally, additional data points for the first variable, additional data points for the second variable, and/or data points for additional variables) with all of the first set of data points of the first variable equally weighted is replaced with a plot 226C representing a set of the data points for the second variable generated according to the third model applied to the first set of data points for the first variable and the first set of data points for the second variable (and, optionally, additional data points for the first variable, additional data points for the second variable, and/or data points for additional variables) with the portion of the first set of data points corresponding to the portion of the first section 211 of the first graphing area 210 indicated by the selection indicator 217C weighted by half as compared to the remainder of the first set of data points for the first variable.

FIG. 2K illustrates the cursor 250 at the location of the weight-increase affordance 242A.

FIG. 2L illustrates the user interface 200 of FIG. 2K in response to detecting a user input corresponding to selection of the weight-increase affordance 242A. In response to detecting a user input corresponding to selection of the weight-increase affordance 242A, the weight level affordance 241 indicates that the weighting of the selected data (e.g., the portion of the first set of data points corresponding to the portion of the first section 211 of the first graphing area 210 indicated by the selection indicator 217C) has changed from 50% to 55%.

Accordingly, the plot 216C is replaced with a plot 216D in which the selected data is weighted by 55% rather than 50% and the plot 226C is replaced with a plot 226D in which the selected data is weighted by 55% rather than 50%.

FIG. 2L illustrates the cursor 250 at the location of the weight level affordance 241.

FIG. 2M illustrates the user interface 200 of FIG. 2M in response to a user input corresponding to selection of the weight level affordance 241 and further user input (e.g., via a keyboard) indicating a weighting of 75%. In response to detecting the user input indicating the weighting of 75%, the weight level affordance 241 indicates that the weighting of the selected data (e.g., the portion of the first set of data points corresponding to the portion of the first section 211 of the first graphing area 210 indicated by the selection indicator 217C) has changed from 55% to 75%.

Accordingly, the plot 216D is replaced with a plot 216E in which the selected data is weighted by 75% rather than 55% and the plot 226D is replaced with a plot 226E in which the selected data is weighted by 75% rather than 55%.

FIG. 2M illustrates the cursor 250 at the location of the confidence toggle affordance 234.

FIG. 2N illustrates the user interface 200 of FIG. 2M in response to detecting a user input corresponding to selection of the confidence toggle affordance 234. In FIG. 2M, the confidence toggle affordance 234 is toggled (e.g., activated), resulting in the display of confidence bounds 218 in the second section 212 of the first graphing area 210 and confidence bounds 228 in the second section 222 of the second graphing area 220 indicating, e.g., percentile bounds generated by the third model.

FIG. 3 is a flowchart representation of a method 300 of displaying modeled data in accordance with some embodiments. In some embodiments (and as detailed below as an example), the method 300 is performed by modeling system, such as the modeling system 100 of FIG. 1, or a portion thereof. In some embodiments, the method 300 is performed by an electronic device with a display device and one or more input devices. In some embodiments, the method 300 is performed by processing logic, including hardware, firmware, software, or a combination thereof. In some embodiments, the method 300 is performed by a processor executing code stored in a non-transitory computer-readable medium (e.g., a memory).

The method 300 begins, in block 310, with the modeling system displaying, on the display device, a first graphing area section presenting a plot of a first set of data points for a first variable. For example, in FIG. 2A, the user interface 200 includes the first graphing area 210 including the first section 211 (e.g., a first graphing area section) presenting a plot 215 of a first set of data points for the first variable.

In various implementations, the first set of data points for the first variable represents the value of a variable over time. Thus, in various implementations, each of the first set of data points for the first variable includes a first value (e.g., a time value) and a corresponding second value (e.g., a variable value). In various implementations, the first set of data points for the first variable represents, for example only, a population over time, a communications network bandwidth over time, a cost over time, a drug efficacy over time, or a user biometric over time.

In various implementations, the modeling system further determines, based at least on the first set of data points for the first variable, a preliminary second set of data points and displays, on the display device, a second graphing area section presenting a plot of the preliminary second set of data points. For example, in FIG. 2C, the user interface includes the first graphing area 210 including the second section 212 (e.g., a second graphing area section) presenting the plot 216A of a second set of data points for the first variable generated according to a model applied to the first set of data points for the first variable (and, optionally, additional data points for the first variable and/or data points for additional variables). As another example, in FIG. 2C, the user interface 200 includes the second graphing area 220 including the second section 222 (e.g., a second graphing area section) presenting the plot 226A of a set of data points for the second variable generated according to a model applied to the first set of data points for the first variable (and, optionally, additional data points for the first variable and/or data points for additional variables).

The method 300 continues, in block 320, with the modeling system detecting, via the one or more input devices, a first user input indicative of a selection of a portion of the first graphing area section. In various implementations, the detecting the first user input indicative of a selection of a portion of the first graphing area section includes detecting a user input moving from a first location within the first graphing area section to a second location within the first graphing area section. In various implementations, detecting the first user input includes detecting movement of a mouse, while a mouse button is clicked, to effect movement of a corresponding cursor along a path from the first location to the second location. In various implementations, detecting the first user input includes detecting contact (e.g., of a finger or a stylus) on a touch-sensitive surface moving along a path from the first location to the second location.

For example, in FIG. 2H1, the user interface 200 illustrates the cursor 250 moving along a path within the first section 211 from a first location to a second location the same as or proximate to the first location. Accordingly, the first user input is indicative of a selection of a portion of the first section 211 indicated by the selection indicator 217A. As another example, in FIG. 2I1, the user interface 200 illustrates the cursor 250 moving along a path within the first section 211 from a first location to a second location to the right of the first location. Accordingly, the first user input is indicative of a selection of a portion of the first section 211 indicated by the selection indicator 217B. As another example, in FIG. 2J1, the user interface 200 illustrates the cursor 250 moving along a path within the first section 211 from a first location to a second location to the right and below the first location. Accordingly, the first user input is indicative of a selection of a portion of the first section 211 indicated by the selection indicator 217C.

The method 300 continues, in block 330, with the modeling system determining, based on the first user input indicative of a selection of a portion of the first graphing area section, a portion of the first set of data points for the first variable. In various implementations, the portion of the first set of data points are those having representations within the selected portion of the first graphing area section.

In various implementations, the method 300 includes detecting, via the one or more input devices, a user input corresponding to selection of a weighting affordance that, when selected, activates a weighting mode and determining the portion of the first set of data points for the first variable (in block 330) is performed in response to determining that the weighting mode is active. For example, in FIG. 2G, the cursor 250 is displayed at the location of the weighting affordance 240 that, when selected, activates a weighting mode. In various implementations, the modeling system performs the steps of block 340, 350, and 360 in response to detecting that a weighting mode is activated.

The method 300 continues, in block 340, with the modeling system detecting, via the one or more input devices, a second user input indicative of a weighting of the portion of the first set of data points for the first variable. In various implementations, detecting the second user input indicative of a weighting includes detecting a user input corresponding to selection of a weight augmentation affordance. For example, in FIG. 2J2, the cursor 250 is displayed at the location of the weight-half affordance 242D that, when selected, halves the weighting of the portion of the first set of data points for the first variable. As another example, in FIG. 2K, the cursor 250 is displayed at the location of the weight-increase affordance 242A that, when selected, increases the weighting of the portion of the first set of data points by a predetermined amount. In various implementations, detecting the second user input indicative of a weighting includes detecting a user input corresponding to selection of a weight level affordance. For example, in FIG. 2L, the cursor 250 is displayed at the location of the weight level affordance 241 that, when selected, allows a user to input (e.g., via a keyboard) a weighting.

The method 300 continues, in block 350, with the modeling system determining, based on the weighting, a second set of data points. For example, in FIG. 2M, in response to the weighting for the portion of the first set of data points for the first variable (corresponding to the portion of the first section 211 indicated by the selection indicator 217C) being changed to 75%, the user interface 200 includes the plot 216E and the plot 226E.

In various implementations, the modeling system generates the second set of data points by applying a model to at least the first set of data points for the first variable. In various implementations, the modeling system applies the model to other sets of data points for the first variable or other variables. In various implementations, the model includes corresponding coefficients associated with respective data points and the weighting correspondingly changes the coefficients (e.g., replaces the coefficients with weighted coefficients equal to the coefficients multiplied by the weighting).

In various implementations, the second set of data points includes a second set of data points for the first variable. For example, in FIG. 2M, the user interface 200 includes the plot 216E. In various implementations, the second set of data points includes a set of a data points for a second variable. For example, in FIG. 2M, the user interface 200 includes the plot 226E.

The method 300 continues, in block 360, with the modeling system displaying, on the display device, a second graphing area section presenting a plot of the second set of data points. In some embodiments, a first graphing area includes the first graphing area section and the second graphing area section. For example, in FIG. 2M, the user interface 200 includes the plot 215 in the first section 211 of the first graphing area 210 and the plot 216E in the second section 212 of the first graphing area 210. In some embodiments, a first graphing area includes the first graphing area section and a second graphing area includes the second graphing area section. For example, in FIG. 2M, the user interface 200 includes the plot 215 in the first section 211 of the first graphing area 210 and the plot 226E in the second section 222 of the second graphing area 220. Further, in some embodiments, the second graphing area is displayed concurrently with the first graphing area. As another example, in FIG. 2M, the user interface 200 includes the plot 215 in the first section 211 of the first graphing area and the plot 226E in the second section 222 of the second graphing area 220 displayed concurrently with the first graphing area 210. In various implementations, the modeling system displays the second graphing area over the first graphing area.

In various implementations, the method 300 includes detecting, via the one or more input devices, a user input corresponding to selection of the second variable and displaying the second graphing area section presenting a plot of the second set of data points is performed in response to detecting the user input corresponding to selection of the second variable. For example, in FIG. 2C, the user interface 200 includes the second variable display toggle affordance 235B activated in response to a user input corresponding to selection of the second variable display toggle affordance 235B.

Figure 4:
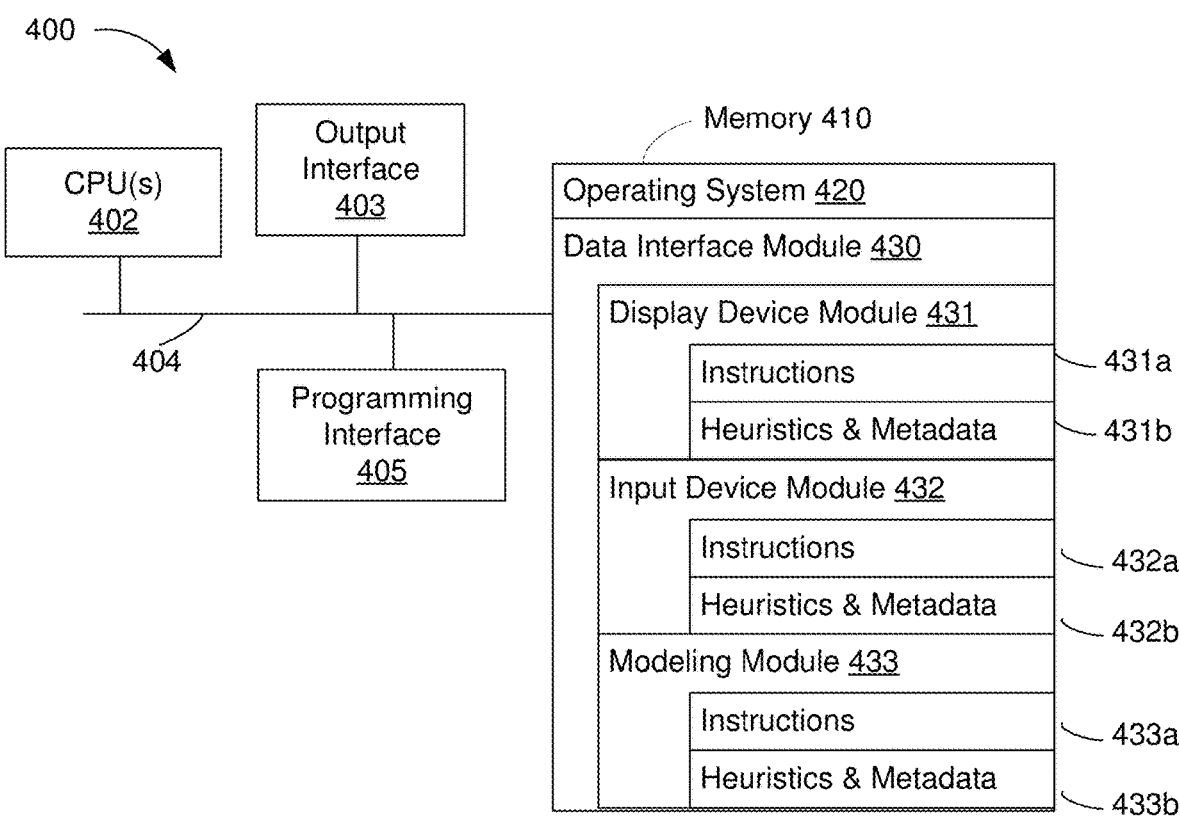
FIG. 4 is a block diagram of an example device in accordance with some embodiments.

FIG. 4 is a block diagram of an example device 400 in accordance with some embodiments. In some embodiments, the device corresponds to the modeling system 100 of FIG. 1 and performs one or more of the functionalities described above with respect to that system. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the device 400 includes one or more processing units (CPU(s)) 402 (e.g., processors), one or more output interfaces 403 (e.g., a network interface), a memory 410, a programming interface 405, and one or more communication buses 404 for interconnecting these and various other components.

In some embodiments, the communication buses 404 include circuitry that interconnects and controls communications between system components. The memory 410 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 410 optionally includes one or more storage devices remotely located from the CPU(s) 402. The memory 410 comprises a non-transitory computer readable storage medium. Moreover, in some embodiments, the memory 410 or the non-transitory computer readable storage medium of the memory 410 stores the following programs, modules and data structures, or a subset thereof including an optional operating system 420 and a data interface module 430 including a display device module 431, an input device module 432, and a modeling module 433. In some embodiments, one or more instructions are included in a combination of logic and non-transitory memory. The operating system 420 includes procedures for handling various basic system services and for performing hardware dependent tasks.

In some embodiments, the display device module 431 is configured to display, on a display device, a first graphing area section presenting a plot of a first set of data points for a first variable. To that end, the display device module 431 includes a set of instructions 431a and heuristics and metadata 431b.

In some embodiments, the input device module 432 is configured to detect, via one or more input devices, a first user input indicative of a selection of a portion of the first graphing area section. To that end, the input device module 432 includes a set of instructions 432a and heuristics and metadata 432b.

In some embodiments, the modeling module 433 is configured to determine, based on the first user input indicative of a selection of a portion of the first graphing area section, a portion of the first set of data points for the first variable. To that end, the modeling module 433 includes a set of instructions 433a and heuristics and metadata 433b.

In some embodiments, the input device module 432 is further configured to detect, via the one or more input devices, a second user input indicative of a weighting of the portion of the first set of data points for the first variable, the modeling module 433 is further configured to determine, based on the weighting, a second set of data points, and the display module 431 is further configured to display, on the display device, a second graphing area section presenting a plot of the second set of data points.

Although the display device module 431, the input device module 432, and the modeling module 433 are illustrated as residing on a single device 400, it should be understood that in other embodiments, any combination of the display device module 431, the input device module 432, and the modeling module 433 can reside in separate devices. For example, in some embodiments, each of the display device module 431, the input device module 432, and the modeling module 433 reside in a separate device.

Moreover, FIG. 4 is intended more as functional description of the various features which be present in a particular embodiment as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another and, in some embodiments, depends in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device with a display device and one or more input devices:
displaying, on the display device, a first graphing area section presenting a plot of a first set of data points for a first variable;
detecting, via the one or more input devices, a first user input moving within the first graphing area section to select a portion of the first graphing area section corresponding to a portion of the first set of data points for the first variable;
displaying a selection indicator indicating the selected portion of the first graphing area;
detecting, via the one or more input devices, a second user input indicative of a weighting of the portion of the first set of data points for the first variable corresponding to the selected portion of the first graphing area section;
determining, based on the weighting, a second set of data points; and
while displaying the first graphing area section presenting the plot of the first set of data points for the first variable, displaying, on the display device, a second graphing area section presenting a plot of the second set of data points.

2. The method of claim 1, wherein the second set of data points includes a second set of data points for the first variable.

3. The method of claim 2, wherein a first graphing area includes the first graphing area section and the second graphing area section.

4. The method of claim 1, wherein the second set of data points includes a set of data points for a second variable.

5. The method of claim 4, further comprising detecting, via the one or more input devices, a user input corresponding to a selection of the second variable, wherein displaying the second graphing area section presenting a plot of the second set of data points is performed in response to detecting the user input corresponding to a selection of the second variable.

6. The method of claim 4, wherein a first graphing area includes the first graphing area section and a second graphing area includes the second graphing area section.

7. The method of claim 1, wherein detecting the first user input includes detecting a user input moving from a first location corresponding to a first value of a first coordinate of the first graphing area section to a second location corresponding to a second value of the first coordinate of the first graphing area section the first graphing area section, wherein the portion of the first set of data points for the first variable is defined as points of the first set of data points having a value of the first coordinate between the first value of the first coordinate and the second value of the first coordinate.

8. The method of claim 1, wherein detecting the second user input indicative of a weighting includes detecting a user input corresponding to selection of a weight level affordance.

9. The method of claim 1, wherein detecting the second user input indicative of a weighting includes detecting a user input corresponding to selection of a weight augmentation affordance.

10. The method of claim 1, wherein determining the second set of data points is further based on the first set of data points for the first variable.

11. The method of claim 1, further comprising detecting, via the one or more input devices, a user input corresponding to selection of a weighting affordance that, when selected, activates a weighting mode, wherein detecting the first user input to define the portion of the first set of data points for the first variable is performed in response to determining that the weighting mode is active.

12. The method of claim 1, further comprising, prior to detecting the second user input indicative of the weighting:
  determining, based at least on the first set of data points for the first variable, a preliminary second set of data points; and
  displaying, on the display device, the second graphing area section presenting a plot of the preliminary second set of data points.

13. An electronic device comprising:
  a display device;
  one or more input devices; and
  one or more processors configured to:
    display, on the display device, a first graphing area section presenting a plot of a first set of data points for a first variable;
    detect, via the one or more input devices, a first user input moving within the first graphing area section to select a portion of the first graphing area section corresponding to a portion of the first set of data points for the first variable;
    display a selection indicator indicating the selected portion of the first graphing area;
    detect, via the one or more input devices, a second user input indicative of a weighting of the portion of the first set of data points for the first variable corresponding to the selected portion of the first graphing area section;
    determine, based on the weighting, a second set of data points; and
    while displaying the first graphing area section presenting the plot of the first set of data points for the first variable, display, on the display device, a second graphing area section presenting a plot of the second set of data points.

14. The electronic device of claim 13, wherein the one or more processors are configured to detect the second user input indicative of a weighting by detecting a user input corresponding to selection of a weight level affordance.

15. The electronic device of claim 13, wherein the one or more processors are configured to detect the second user input indicative of a weighting by detecting a user input corresponding to selection of a weight augmentation affordance.

16. The electronic device of claim 13, wherein the one or more processors are further configured to detect, via the one or more input devices, a user input corresponding to selection of a weighting affordance that, when selected, activates a weighting mode, wherein the one or more processors detect the first user input to define the portion of the first set of data points for the first variable in response to determining that the weighting mode is active.

17. A non-transitory computer-readable medium encoding instructions which, when executed by a processor of an electronic device including a display device and one or more input devices, causes the electronic device to:
  display, on the display device, a first graphing area section presenting a plot of a first set of data points for a first variable;
  detect, via the one or more input devices, a first user input moving within the first graphing area section to select a portion of the first graphing area section corresponding to a portion of the first set of data points for the first variable;
  display a selection indicator indicating the selected portion of the first graphing area;
  detect, via the one or more input devices, a second user input indicative of a weighting of the portion of the first set of data points for the first variable corresponding to the selected portion of the first graphing area section;
  determine, based on the weighting, a second set of data points; and
  while displaying the first graphing area section presenting the plot of the first set of data points for the first variable, display, on the display device, a second graphing area section presenting a plot of the second set of data points.

18. The method of claim 1, wherein detecting the first user input includes detecting a user input moving from a first location corresponding to a first value of a first coordinate of the first graphing area section and a first value of a second coordinate of the first graphing area section to a second location corresponding to a second value of the first coordinate of the first graphing area section and a second value of the second coordinate of the first graphing area section, wherein the portion of the first set of data points for the first variable is defined as points of the first set of data points having a value of the first coordinate between the first value of the first coordinate and the second value of the first coordinate and a value of the second coordinate between the first value of the second coordinate and the second value of the second coordinate.

19. The method of claim 9, wherein the weight augmentation affordance increases or decreases the weighting of the portion of the first set of data points for the first variable by an amount associated with the weight augmentation affordance.

* * * * *